(12) United States Patent
Geil et al.

(10) Patent No.: US 11,770,401 B2
(45) Date of Patent: *Sep. 26, 2023

(54) CORRELATED RISK IN CYBERSECURITY

(71) Applicant: BitSight Technologies, Inc., Boston, MA (US)

(72) Inventors: Ethan Geil, Concord, MA (US); Marc Light, Somerville, MA (US)

(73) Assignee: BitSight Technologies, Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/179,630

(22) Filed: Feb. 19, 2021

(65) Prior Publication Data

US 2021/0176269 A1    Jun. 10, 2021

Related U.S. Application Data

(63) Continuation of application No. 16/795,056, filed on Feb. 19, 2020, now Pat. No. 10,931,705, which is a (Continued)

(51) Int. Cl.
*H04L 9/40* (2022.01)
*G06F 21/57* (2013.01)
(Continued)

(52) U.S. Cl.
CPC .... *H04L 63/1433* (2013.01); *G06F 16/24578* (2019.01); *G06F 16/288* (2019.01);
(Continued)

(58) Field of Classification Search
CPC ............ G06F 16/24578; G06F 16/288; G06F 16/9024; G06F 17/18; G06F 21/577; G06F 2221/034; H04L 63/1408; H04L 63/1433
See application file for complete search history.

(56) References Cited

U.S. PATENT DOCUMENTS 5,867,799 A    2/1999 Lang et al.
6,016,475 A    1/2000 Miller et al.
(Continued)

FOREIGN PATENT DOCUMENTS

WO    WO-2017/142694 A1    8/2017
WO    WO-2019/023045 A1    1/2019

OTHER PUBLICATIONS

Search Query Report from IP.com (performed Jul. 29, 2022) (Year: 2022).*

(Continued)

*Primary Examiner* — Sharon S Lynch
(74) *Attorney, Agent, or Firm* — Goodwin Procter LLP

(57) ABSTRACT

Computer-implemented methods are provided herein for quantifying correlated risk in a network of a plurality of assets having at least one dependency, where each asset belongs to at least one entity. The method includes generating a dependency graph based on relationships between the assets, at least one dependency, and at least one entity, and executing a plurality of Monte Carlo simulations over the dependency graph. Executing a plurality of Monte Carlo simulations includes generating a seed event in the dependency graph, where the seed event has a probability distribution, and propagating disruption through the dependency graph based on the seed event. The method further includes assessing loss for each of the assets, and aggregating losses for two or more assets to determine correlated risk in the network.

19 Claims, 5 Drawing Sheets

Related U.S. Application Data continuation of application No. 16/292,956, filed on Mar. 5, 2019, now Pat. No. 10,594,723, which is a continuation of application No. 15/918,286, filed on Mar. 12, 2018, now Pat. No. 10,257,219.

(51) Int. Cl.
- *G06F 16/28* (2019.01)
- *G06F 16/901* (2019.01)
- *G06F 16/2457* (2019.01)
- *G06F 17/18* (2006.01)

(52) U.S. Cl.
CPC ........ *G06F 16/9024* (2019.01); *G06F 21/577* (2013.01); *H04L 63/1408* (2013.01); *G06F 17/18* (2013.01); *G06F 2221/034* (2013.01)

(56) References Cited

U.S. PATENT DOCUMENTS

| | | |
|---|---|---|
| 6,745,150 B1 | 6/2004 | Breiman |
| 6,785,732 B1 | 8/2004 | Bates et al. |
| 6,792,401 B1 | 9/2004 | Nigro et al. |
| 7,062,572 B1 | 6/2006 | Hampton |
| D525,264 S | 7/2006 | Chotai et al. |
| D525,629 S | 7/2006 | Chotai et al. |
| 7,100,195 B1 | 8/2006 | Underwood |
| 7,194,769 B2 | 3/2007 | Lippmann et al. |
| 7,290,275 B2 | 10/2007 | Baudoin et al. |
| 7,389,262 B1 * | 6/2008 | Lange .................. G06Q 40/00 705/37 |
| D604,740 S | 11/2009 | Matheny et al. |
| 7,650,570 B2 | 1/2010 | Torrens et al. |
| 7,747,778 B1 | 6/2010 | King et al. |
| 7,748,038 B2 | 6/2010 | Olivier et al. |
| 7,827,607 B2 | 11/2010 | Sobel et al. |
| D630,645 S | 1/2011 | Tokunaga et al. |
| 7,971,252 B2 | 6/2011 | Lippmann et al. |
| 8,000,698 B2 | 8/2011 | Wolman et al. |
| D652,048 S | 1/2012 | Joseph |
| 8,150,538 B2 * | 4/2012 | Dubinsky .............. G06Q 40/08 700/79 |
| D667,022 S | 9/2012 | LoBosco et al. |
| 8,359,651 B1 | 1/2013 | Wu et al. |
| 8,370,933 B1 | 2/2013 | Buckler |
| 8,429,630 B2 | 4/2013 | Nickolov et al. |
| D682,287 S | 5/2013 | Cong et al. |
| D688,260 S | 8/2013 | Pearcy et al. |
| 8,504,556 B1 | 8/2013 | Rice et al. |
| 8,505,094 B1 | 8/2013 | Xuewen et al. |
| D691,164 S | 10/2013 | Lim et al. |
| D694,252 S | 11/2013 | Helm |
| D694,253 S | 11/2013 | Helm |
| 8,584,233 B1 | 11/2013 | Yang et al. |
| 8,601,575 B2 | 12/2013 | Mullarkey et al. |
| 8,621,621 B1 | 12/2013 | Burns et al. |
| 8,661,146 B2 | 2/2014 | Alex et al. |
| D700,616 S | 3/2014 | Chao |
| 8,677,481 B1 | 3/2014 | Lee |
| 8,752,183 B1 | 6/2014 | Heiderich et al. |
| 8,775,402 B2 | 7/2014 | Baskerville et al. |
| 8,806,646 B1 | 8/2014 | Daswani et al. |
| 8,825,662 B1 | 9/2014 | Kingman et al. |
| 8,949,988 B2 | 2/2015 | Adams et al. |
| 8,966,639 B1 | 2/2015 | Roytman et al. |
| D730,918 S | 6/2015 | Park et al. |
| 9,053,210 B2 | 6/2015 | Elnikety et al. |
| 9,075,990 B1 | 7/2015 | Yang |
| D740,847 S | 10/2015 | Yampolskiy et al. |
| D740,848 S | 10/2015 | Bolts et al. |
| D741,351 S | 10/2015 | Kito et al. |
| D746,832 S | 1/2016 | Pearcy et al. |
| 9,241,252 B2 | 1/2016 | Dua et al. |
| 9,244,899 B1 | 1/2016 | Greenbaum |
| 9,294,498 B1 | 3/2016 | Yampolskiy et al. |
| D754,690 S | 4/2016 | Park et al. |
| D754,696 S | 4/2016 | Follett et al. |
| D756,371 S | 5/2016 | Bertnick et al. |
| D756,372 S | 5/2016 | Bertnick et al. |
| D756,392 S | 5/2016 | Yun et al. |
| D759,084 S | 6/2016 | Yampolskiy et al. |
| D759,689 S | 6/2016 | Olson et al. |
| 9,372,994 B1 | 6/2016 | Yampolskiy et al. |
| 9,373,144 B1 | 6/2016 | Ng et al. |
| D760,782 S | 7/2016 | Kendler et al. |
| 9,384,206 B1 | 7/2016 | Bono et al. |
| 9,401,926 B1 * | 7/2016 | Dubow ............... H04L 63/1408 |
| 9,407,658 B1 | 8/2016 | Kuskov et al. |
| 9,420,049 B1 | 8/2016 | Talmor et al. |
| 9,424,333 B1 | 8/2016 | Bisignani et al. |
| 9,479,526 B1 | 10/2016 | Yang |
| D771,103 S | 11/2016 | Eder |
| D771,695 S | 11/2016 | Yampolskiy et al. |
| D772,276 S | 11/2016 | Yampolskiy et al. |
| 9,501,647 B2 | 11/2016 | Yampolskiy et al. |
| D773,507 S | 12/2016 | Sagrillo et al. |
| D775,635 S | 1/2017 | Raji et al. |
| D776,136 S | 1/2017 | Chen et al. |
| D776,153 S | 1/2017 | Yampolskiy et al. |
| D777,177 S | 1/2017 | Chen et al. |
| 9,560,072 B1 | 1/2017 | Xu |
| D778,927 S | 2/2017 | Bertnick et al. |
| D778,928 S | 2/2017 | Bertnick et al. |
| D779,512 S | 2/2017 | Kimura et al. |
| D779,514 S | 2/2017 | Baris et al. |
| D779,531 S | 2/2017 | List et al. |
| D780,770 S | 3/2017 | Sum et al. |
| D785,009 S | 4/2017 | Lim et al. |
| D785,010 S | 4/2017 | Bachman et al. |
| D785,016 S | 4/2017 | Berwick et al. |
| 9,620,079 B2 | 4/2017 | Curtis |
| D787,530 S | 5/2017 | Huang |
| D788,128 S | 5/2017 | Wada |
| 9,641,547 B2 | 5/2017 | Yampolskiy et al. |
| 9,646,110 B2 | 5/2017 | Byrne et al. |
| D789,947 S | 6/2017 | Sun |
| D789,957 S | 6/2017 | Wu et al. |
| 9,680,855 B2 * | 6/2017 | Schultz .................. G09C 1/00 |
| 9,680,858 B1 | 6/2017 | Boyer et al. |
| D791,153 S | 7/2017 | Rice et al. |
| D791,834 S | 7/2017 | Eze et al. |
| D792,427 S | 7/2017 | Weaver et al. |
| D795,891 S | 8/2017 | Kohan et al. |
| 9,736,019 B2 | 8/2017 | Hardison et al. |
| D796,523 S | 9/2017 | Bhandari et al. |
| D801,989 S | 11/2017 | Iketsuki et al. |
| D803,237 S | 11/2017 | Wu et al. |
| D804,528 S | 12/2017 | Martin et al. |
| D806,735 S | 1/2018 | Olsen et al. |
| D806,737 S | 1/2018 | Chung et al. |
| D809,523 S | 2/2018 | Lipka et al. |
| D809,989 S | 2/2018 | Lee et al. |
| D812,633 S | 3/2018 | Saneii |
| D814,483 S | 4/2018 | Gavaskar et al. |
| D815,119 S | 4/2018 | Chalker et al. |
| D815,148 S | 4/2018 | Martin et al. |
| D816,105 S | 4/2018 | Rudick et al. |
| D816,116 S | 4/2018 | Selassie |
| 9,954,893 B1 | 4/2018 | Zhao et al. |
| D817,970 S | 5/2018 | Chang et al. |
| D817,977 S | 5/2018 | Kato et al. |
| D818,475 S | 5/2018 | Yepez et al. |
| D819,687 S | 6/2018 | Yampolskiy et al. |
| 10,044,750 B2 | 8/2018 | Livshits et al. |
| 10,079,854 B1 | 9/2018 | Scott et al. |
| 10,142,364 B2 | 11/2018 | Baukes et al. |
| D835,631 S | 12/2018 | Yepez et al. |
| 10,180,966 B1 | 1/2019 | Lang et al. |
| 10,185,924 B1 | 1/2019 | McClintock et al. |
| 10,210,329 B1 | 2/2019 | Malik et al. |
| 10,217,071 B2 | 2/2019 | Mo et al. |
| 10,230,753 B2 | 3/2019 | Yampolskiy et al. |
| 10,230,764 B2 | 3/2019 | Ng et al. |
| 10,235,524 B2 | 3/2019 | Ford |

(56) References Cited

U.S. PATENT DOCUMENTS

| | | | |
|---|---|---|---|
| D847,169 S | 4/2019 | Sombreireiro et al. | |
| 10,257,219 B1* | 4/2019 | Geil | G06F 16/24578 |
| 10,305,854 B2 | 5/2019 | Alizadeh-Shabdiz et al. | |
| 10,331,502 B1 | 6/2019 | Hart | |
| 10,339,321 B2 | 7/2019 | Tedeschi | |
| 10,339,484 B2 | 7/2019 | Pai et al. | |
| 10,348,755 B1 | 7/2019 | Shavell et al. | |
| 10,412,083 B2 | 9/2019 | Zou et al. | |
| D863,335 S | 10/2019 | Hardy et al. | |
| D863,345 S | 10/2019 | Hardy et al. | |
| 10,453,142 B2* | 10/2019 | Mun | G06Q 40/08 |
| 10,469,515 B2 | 11/2019 | Helmsen et al. | |
| 10,491,619 B2 | 11/2019 | Yampolskiy et al. | |
| 10,491,620 B2 | 11/2019 | Yampolskiy et al. | |
| 10,521,583 B1 | 12/2019 | Bagulho Monteiro Pereira | |
| D872,574 S | 1/2020 | Deylamian et al. | |
| 10,540,374 B2 | 1/2020 | Singh et al. | |
| D874,506 S | 2/2020 | Kang et al. | |
| 10,572,945 B1* | 2/2020 | McNair | G06Q 40/08 |
| D880,512 S | 4/2020 | Greenwald et al. | |
| D894,939 S | 9/2020 | Braica | |
| 10,764,298 B1 | 9/2020 | Light et al. | |
| 10,776,483 B2 | 9/2020 | Bagulho Monteiro Pereira | |
| 10,796,260 B2 | 10/2020 | Brannon et al. | |
| D903,693 S | 12/2020 | Li et al. | |
| D905,712 S | 12/2020 | Li et al. | |
| D908,139 S | 1/2021 | Hardy et al. | |
| 10,896,394 B2 | 1/2021 | Brannon et al. | |
| 10,909,488 B2 | 2/2021 | Hecht et al. | |
| D918,955 S | 5/2021 | Madden, Jr. et al. | |
| D920,343 S | 5/2021 | Bowland | |
| D920,353 S | 5/2021 | Boutros et al. | |
| D921,031 S | 6/2021 | Tessier et al. | |
| D921,662 S | 6/2021 | Giannino et al. | |
| D921,674 S | 6/2021 | Kmak et al. | |
| D921,677 S | 6/2021 | Kmak et al. | |
| D922,397 S | 6/2021 | Modi et al. | |
| D924,909 S | 7/2021 | Nasu et al. | |
| 11,126,723 B2 | 9/2021 | Bagulho Monteiro Pereira | |
| 11,379,773 B2 | 7/2022 | Vescio | |
| 2001/0044798 A1 | 11/2001 | Nagral et al. | |
| 2002/0083077 A1 | 6/2002 | Vardi | |
| 2002/0133365 A1 | 9/2002 | Grey et al. | |
| 2002/0164983 A1 | 11/2002 | Raviv et al. | |
| 2003/0011601 A1 | 1/2003 | Itoh et al. | |
| 2003/0050862 A1 | 3/2003 | Bleicken et al. | |
| 2003/0074248 A1 | 4/2003 | Braud et al. | |
| 2003/0123424 A1 | 7/2003 | Jung | |
| 2003/0187967 A1* | 10/2003 | Walsh | H04L 41/147 |
| | | | 714/2 |
| 2004/0003284 A1 | 1/2004 | Campbell et al. | |
| 2004/0010709 A1 | 1/2004 | Baudoin et al. | |
| 2004/0024859 A1 | 2/2004 | Bloch et al. | |
| 2004/0088570 A1 | 5/2004 | Roberts et al. | |
| 2004/0098375 A1 | 5/2004 | DeCarlo | |
| 2004/0111358 A1* | 6/2004 | Lange | G07F 17/32 |
| | | | 705/37 |
| 2004/0133561 A1 | 7/2004 | Burke | |
| 2004/0133689 A1 | 7/2004 | Vasisht | |
| 2004/0193907 A1 | 9/2004 | Patanella | |
| 2004/0193918 A1 | 9/2004 | Green et al. | |
| 2004/0199791 A1 | 10/2004 | Poletto et al. | |
| 2004/0199792 A1 | 10/2004 | Tan et al. | |
| 2004/0221296 A1 | 11/2004 | Ogielski et al. | |
| 2004/0250122 A1 | 12/2004 | Newton | |
| 2004/0250134 A1 | 12/2004 | Kohler et al. | |
| 2005/0065807 A1 | 3/2005 | DeAngelis et al. | |
| 2005/0066195 A1* | 3/2005 | Jones | G06F 21/577 |
| | | | 726/4 |
| 2005/0071450 A1 | 3/2005 | Allen et al. | |
| 2005/0076245 A1 | 4/2005 | Graham et al. | |
| 2005/0080720 A1 | 4/2005 | Betz et al. | |
| 2005/0108415 A1 | 5/2005 | Turk et al. | |
| 2005/0131830 A1 | 6/2005 | Juarez et al. | |
| 2005/0138413 A1 | 6/2005 | Lippmann et al. | |
| 2005/0160002 A1 | 7/2005 | Roetter et al. | |
| 2005/0234767 A1 | 10/2005 | Bolzman et al. | |
| 2005/0278726 A1 | 12/2005 | Cano et al. | |
| 2006/0036335 A1 | 2/2006 | Banter et al. | |
| 2006/0107226 A1 | 5/2006 | Matthews et al. | |
| 2006/0173992 A1 | 8/2006 | Weber et al. | |
| 2006/0212925 A1 | 9/2006 | Shull et al. | |
| 2006/0253581 A1 | 11/2006 | Dixon et al. | |
| 2006/0271564 A1 | 11/2006 | Meng Muntz et al. | |
| 2007/0016948 A1 | 1/2007 | Dubrovsky et al. | |
| 2007/0067845 A1* | 3/2007 | Wiemer | H04L 41/28 |
| | | | 726/25 |
| 2007/0113282 A1 | 5/2007 | Ross | |
| 2007/0136622 A1 | 6/2007 | Price et al. | |
| 2007/0143851 A1 | 6/2007 | Nicodemus et al. | |
| 2007/0179955 A1 | 8/2007 | Croft et al. | |
| 2007/0198275 A1 | 8/2007 | Malden et al. | |
| 2007/0214151 A1 | 9/2007 | Thomas et al. | |
| 2007/0282730 A1 | 12/2007 | Carpenter et al. | |
| 2008/0017526 A1 | 1/2008 | Prescott et al. | |
| 2008/0033775 A1 | 2/2008 | Dawson et al. | |
| 2008/0047018 A1 | 2/2008 | Baudoin et al. | |
| 2008/0091834 A1 | 4/2008 | Norton | |
| 2008/0140495 A1 | 6/2008 | Bhamidipaty et al. | |
| 2008/0140728 A1 | 6/2008 | Fraser et al. | |
| 2008/0148408 A1 | 6/2008 | Kao et al. | |
| 2008/0162931 A1 | 7/2008 | Lord et al. | |
| 2008/0172382 A1 | 7/2008 | Prettejohn | |
| 2008/0175266 A1 | 7/2008 | Alperovitch et al. | |
| 2008/0208995 A1 | 8/2008 | Takahashi et al. | |
| 2008/0209565 A2 | 8/2008 | Baudoin et al. | |
| 2008/0222287 A1* | 9/2008 | Bahl | H04L 41/5058 |
| | | | 709/224 |
| 2008/0262895 A1 | 10/2008 | Hofmeister et al. | |
| 2008/0270458 A1 | 10/2008 | Gvelesiani | |
| 2009/0044272 A1 | 2/2009 | Jarrett | |
| 2009/0064337 A1 | 3/2009 | Chien | |
| 2009/0094265 A1 | 4/2009 | Vlachos et al. | |
| 2009/0125427 A1 | 5/2009 | Atwood et al. | |
| 2009/0132861 A1 | 5/2009 | Costa et al. | |
| 2009/0161629 A1 | 6/2009 | Purkayastha et al. | |
| 2009/0193054 A1 | 7/2009 | Karimisetty et al. | |
| 2009/0204235 A1* | 8/2009 | Dubinsky | G06Q 10/0635 |
| | | | 700/32 |
| 2009/0216700 A1 | 8/2009 | Bouchard et al. | |
| 2009/0228830 A1 | 9/2009 | Herz et al. | |
| 2009/0265787 A9 | 10/2009 | Baudoin et al. | |
| 2009/0276835 A1 | 11/2009 | Jackson et al. | |
| 2009/0293128 A1 | 11/2009 | Lippmann et al. | |
| 2009/0299802 A1 | 12/2009 | Brennan | |
| 2009/0300768 A1 | 12/2009 | Krishnamurthy et al. | |
| 2009/0319420 A1 | 12/2009 | Sanchez et al. | |
| 2009/0323632 A1 | 12/2009 | Nix | |
| 2009/0328063 A1 | 12/2009 | Corvera et al. | |
| 2010/0017880 A1 | 1/2010 | Masood | |
| 2010/0024033 A1 | 1/2010 | Kang et al. | |
| 2010/0042605 A1 | 2/2010 | Cheng et al. | |
| 2010/0057582 A1 | 3/2010 | Artin et al. | |
| 2010/0114634 A1 | 5/2010 | Christiansen et al. | |
| 2010/0114757 A1* | 5/2010 | Jeng | G06Q 40/06 |
| | | | 705/38 |
| 2010/0186088 A1 | 7/2010 | Banerjee et al. | |
| 2010/0205042 A1 | 8/2010 | Mun | |
| 2010/0218256 A1 | 8/2010 | Thomas et al. | |
| 2010/0262444 A1 | 10/2010 | Atwal et al. | |
| 2010/0275263 A1 | 10/2010 | Bennett et al. | |
| 2010/0281124 A1 | 11/2010 | Westman et al. | |
| 2010/0281151 A1 | 11/2010 | Ramankutty et al. | |
| 2010/0309206 A1 | 12/2010 | Xie et al. | |
| 2011/0137704 A1 | 6/2011 | Mitra et al. | |
| 2011/0145168 A1* | 6/2011 | Dirnstorfer | G06Q 40/06 |
| | | | 705/36 R |
| 2011/0145576 A1 | 6/2011 | Bettan | |
| 2011/0148880 A1 | 6/2011 | De Peuter | |
| 2011/0185403 A1 | 7/2011 | Dolan et al. | |
| 2011/0213742 A1 | 9/2011 | Lemmond et al. | |
| 2011/0219455 A1 | 9/2011 | Bhagwan et al. | |
| 2011/0225085 A1* | 9/2011 | Takeshita | G06Q 40/025 |
| | | | 705/38 |

(56) References Cited

U.S. PATENT DOCUMENTS

| | | |
|---|---|---|
| 2011/0231395 A1 | 9/2011 | Vadlamani et al. |
| 2011/0239300 A1 | 9/2011 | Klein et al. |
| 2011/0249002 A1 | 10/2011 | Duplessis et al. |
| 2011/0282997 A1 | 11/2011 | Prince et al. |
| 2011/0296519 A1 | 12/2011 | Ide et al. |
| 2012/0008974 A1 | 1/2012 | Kawai et al. |
| 2012/0036263 A1 | 2/2012 | Madden et al. |
| 2012/0036580 A1 | 2/2012 | Gorny et al. |
| 2012/0059823 A1 | 3/2012 | Barber et al. |
| 2012/0089745 A1 | 4/2012 | Turakhia |
| 2012/0158725 A1 | 6/2012 | Molloy et al. |
| 2012/0166458 A1 | 6/2012 | Laudanski et al. |
| 2012/0174219 A1 | 7/2012 | Hernandez et al. |
| 2012/0198558 A1 | 8/2012 | Liu et al. |
| 2012/0215892 A1 | 8/2012 | Wanser et al. |
| 2012/0221376 A1* | 8/2012 | Austin ............ G06Q 40/06 705/7.28 |
| 2012/0255027 A1 | 10/2012 | Kanakapura et al. |
| 2012/0290498 A1* | 11/2012 | Jones ............ G06Q 40/06 705/36 R |
| 2012/0291129 A1 | 11/2012 | Shulman et al. |
| 2013/0014253 A1 | 1/2013 | Neou et al. |
| 2013/0055386 A1 | 2/2013 | Kim et al. |
| 2013/0060351 A1 | 3/2013 | Imming et al. |
| 2013/0080505 A1 | 3/2013 | Nielsen et al. |
| 2013/0086521 A1 | 4/2013 | Grossele et al. |
| 2013/0086687 A1 | 4/2013 | Chess et al. |
| 2013/0091574 A1* | 4/2013 | Howes ............ G06F 21/554 726/25 |
| 2013/0124644 A1 | 5/2013 | Hunt et al. |
| 2013/0124653 A1 | 5/2013 | Vick et al. |
| 2013/0142050 A1 | 6/2013 | Luna |
| 2013/0173791 A1 | 7/2013 | Longo |
| 2013/0212479 A1 | 8/2013 | Willis et al. |
| 2013/0227078 A1 | 8/2013 | Wei et al. |
| 2013/0227697 A1 | 8/2013 | Zandani |
| 2013/0238527 A1* | 9/2013 | Jones ............ G06Q 40/06 705/36 R |
| 2013/0263270 A1 | 10/2013 | Cote et al. |
| 2013/0276056 A1 | 10/2013 | Epstein |
| 2013/0282406 A1 | 10/2013 | Snyder et al. |
| 2013/0291105 A1 | 10/2013 | Yan |
| 2013/0298244 A1 | 11/2013 | Kumar et al. |
| 2013/0305368 A1 | 11/2013 | Ford |
| 2013/0333038 A1 | 12/2013 | Chien |
| 2013/0347116 A1* | 12/2013 | Flores ............ H04L 63/1433 726/25 |
| 2014/0006129 A1 | 1/2014 | Heath |
| 2014/0019196 A1 | 1/2014 | Wiggins et al. |
| 2014/0052998 A1 | 2/2014 | Bloom et al. |
| 2014/0101006 A1 | 4/2014 | Pitt |
| 2014/0108474 A1 | 4/2014 | David et al. |
| 2014/0114755 A1 | 4/2014 | Mezzacca |
| 2014/0114843 A1 | 4/2014 | Klein et al. |
| 2014/0130158 A1 | 5/2014 | Wang et al. |
| 2014/0137257 A1 | 5/2014 | Martinez et al. |
| 2014/0146370 A1 | 5/2014 | Banner et al. |
| 2014/0173066 A1 | 6/2014 | Newton et al. |
| 2014/0173736 A1 | 6/2014 | Liu |
| 2014/0189098 A1 | 7/2014 | MaGill et al. |
| 2014/0204803 A1 | 7/2014 | Nguyen et al. |
| 2014/0237545 A1 | 8/2014 | Mylavarapu et al. |
| 2014/0244317 A1 | 8/2014 | Roberts et al. |
| 2014/0282261 A1 | 9/2014 | Ranz et al. |
| 2014/0283056 A1 | 9/2014 | Bachwani et al. |
| 2014/0283068 A1 | 9/2014 | Call et al. |
| 2014/0288996 A1 | 9/2014 | Rence et al. |
| 2014/0304816 A1 | 10/2014 | Klein et al. |
| 2014/0330616 A1 | 11/2014 | Lyras |
| 2014/0334336 A1 | 11/2014 | Chen et al. |
| 2014/0337086 A1 | 11/2014 | Asenjo et al. |
| 2014/0337633 A1 | 11/2014 | Yang et al. |
| 2014/0344332 A1 | 11/2014 | Giebler |
| 2015/0033331 A1 | 1/2015 | Stern et al. |
| 2015/0033341 A1 | 1/2015 | Schmidtler et al. |
| 2015/0052607 A1 | 2/2015 | Al Hamami |
| 2015/0074579 A1 | 3/2015 | Gladstone et al. |
| 2015/0081860 A1 | 3/2015 | Kuehnel et al. |
| 2015/0088783 A1* | 3/2015 | Mun ............ G06Q 40/02 705/36 R |
| 2015/0156084 A1 | 6/2015 | Kaminsky et al. |
| 2015/0180883 A1 | 6/2015 | Aktas et al. |
| 2015/0195299 A1 | 7/2015 | Zoldi et al. |
| 2015/0207776 A1 | 7/2015 | Morin et al. |
| 2015/0248280 A1 | 9/2015 | Pillay et al. |
| 2015/0261955 A1 | 9/2015 | Huang et al. |
| 2015/0264061 A1 | 9/2015 | Ibatullin et al. |
| 2015/0288706 A1 | 10/2015 | Marshall |
| 2015/0288709 A1 | 10/2015 | Singhal et al. |
| 2015/0310188 A1 | 10/2015 | Ford et al. |
| 2015/0310213 A1 | 10/2015 | Ronen et al. |
| 2015/0317672 A1 | 11/2015 | Espinoza et al. |
| 2015/0331932 A1 | 11/2015 | Georges et al. |
| 2015/0347754 A1 | 12/2015 | Born |
| 2015/0347756 A1 | 12/2015 | Hidayat et al. |
| 2015/0350229 A1 | 12/2015 | Mitchell |
| 2015/0381649 A1* | 12/2015 | Schultz ............ G06Q 10/0635 726/25 |
| 2016/0014081 A1 | 1/2016 | Don, Jr. et al. |
| 2016/0023639 A1 | 1/2016 | Cajiga et al. |
| 2016/0036849 A1 | 2/2016 | Zakian |
| 2016/0065613 A1 | 3/2016 | Cho et al. |
| 2016/0078382 A1 | 3/2016 | Watkins et al. |
| 2016/0088015 A1 | 3/2016 | Sivan et al. |
| 2016/0104071 A1 | 4/2016 | Brueckner |
| 2016/0119373 A1* | 4/2016 | Fausto ............ H04L 63/1433 726/25 |
| 2016/0140466 A1 | 5/2016 | Sidebottom et al. |
| 2016/0147992 A1 | 5/2016 | Zhao et al. |
| 2016/0162602 A1 | 6/2016 | Bradish et al. |
| 2016/0171415 A1 | 6/2016 | Yampolskiy et al. |
| 2016/0173520 A1 | 6/2016 | Foster et al. |
| 2016/0173522 A1 | 6/2016 | Yampolskiy et al. |
| 2016/0182537 A1 | 6/2016 | Tatourian et al. |
| 2016/0189301 A1 | 6/2016 | Ng et al. |
| 2016/0191554 A1 | 6/2016 | Kaminsky |
| 2016/0205126 A1 | 7/2016 | Boyer et al. |
| 2016/0212101 A1 | 7/2016 | Reshadi et al. |
| 2016/0241560 A1 | 8/2016 | Reshadi et al. |
| 2016/0248797 A1 | 8/2016 | Yampolskiy et al. |
| 2016/0253500 A1 | 9/2016 | Aime et al. |
| 2016/0259945 A1 | 9/2016 | Yampolskiy et al. |
| 2016/0337387 A1 | 11/2016 | Hu et al. |
| 2016/0344769 A1 | 11/2016 | Li |
| 2016/0344801 A1 | 11/2016 | Akkarawittayapoom |
| 2016/0364496 A1 | 12/2016 | Li |
| 2016/0373485 A1 | 12/2016 | Kamble |
| 2016/0378978 A1 | 12/2016 | Singla et al. |
| 2017/0048267 A1 | 2/2017 | Yampolskiy et al. |
| 2017/0063901 A1 | 3/2017 | Muddu et al. |
| 2017/0104783 A1 | 4/2017 | Vanunu et al. |
| 2017/0142148 A1 | 5/2017 | Buer et al. |
| 2017/0161253 A1 | 6/2017 | Silver |
| 2017/0161409 A1 | 6/2017 | Martin |
| 2017/0213292 A1 | 7/2017 | Sweeney et al. |
| 2017/0221072 A1 | 8/2017 | AthuluruTlrumala et al. |
| 2017/0223002 A1 | 8/2017 | Sabin et al. |
| 2017/0236078 A1 | 8/2017 | Rasumov |
| 2017/0237764 A1 | 8/2017 | Rasumov |
| 2017/0264623 A1 | 9/2017 | Ficarra et al. |
| 2017/0279843 A1* | 9/2017 | Schultz ............ G06Q 40/08 |
| 2017/0289109 A1 | 10/2017 | Caragea |
| 2017/0300911 A1* | 10/2017 | Alnajem ............ G06Q 20/4014 |
| 2017/0316324 A1 | 11/2017 | Barrett et al. |
| 2017/0318045 A1 | 11/2017 | Johns et al. |
| 2017/0324555 A1 | 11/2017 | Wu et al. |
| 2017/0324766 A1* | 11/2017 | Gonzalez Granadillo ............ H04L 63/20 |
| 2017/0337487 A1 | 11/2017 | Nock et al. |
| 2018/0013716 A1 | 1/2018 | Connell et al. |
| 2018/0088968 A1 | 3/2018 | Myhre et al. |
| 2018/0103043 A1 | 4/2018 | Kupreev et al. |
| 2018/0121659 A1 | 5/2018 | Sawhney et al. |

(56) References Cited

U.S. PATENT DOCUMENTS

| | | |
|---|---|---|
| 2018/0123934 A1 | 5/2018 | Gissing et al. |
| 2018/0124091 A1 | 5/2018 | Sweeney et al. |
| 2018/0124110 A1 | 5/2018 | Hunt et al. |
| 2018/0139180 A1 | 5/2018 | Napchi et al. |
| 2018/0146004 A1 | 5/2018 | Belfiore, Jr. et al. |
| 2018/0157468 A1 | 6/2018 | Stachura |
| 2018/0191768 A1 | 7/2018 | Broda et al. |
| 2018/0285414 A1 | 10/2018 | Kondiles et al. |
| 2018/0322584 A1* | 11/2018 | Crabtree ............... G06N 5/022 |
| 2018/0336348 A1 | 11/2018 | Ng et al. |
| 2018/0337938 A1 | 11/2018 | Kneib et al. |
| 2018/0337941 A1 | 11/2018 | Kraning et al. |
| 2018/0349641 A1 | 12/2018 | Barday et al. |
| 2018/0365519 A1 | 12/2018 | Pollard et al. |
| 2018/0375896 A1 | 12/2018 | Wang et al. |
| 2019/0034845 A1 | 1/2019 | Mo et al. |
| 2019/0065545 A1 | 2/2019 | Hazel et al. |
| 2019/0079869 A1 | 3/2019 | Baldi et al. |
| 2019/0089711 A1 | 3/2019 | Faulkner |
| 2019/0098025 A1 | 3/2019 | Lim |
| 2019/0124091 A1 | 4/2019 | Ujiie et al. |
| 2019/0140925 A1 | 5/2019 | Pon et al. |
| 2019/0141060 A1 | 5/2019 | Lim |
| 2019/0147378 A1 | 5/2019 | Mo et al. |
| 2019/0166152 A1 | 5/2019 | Steele et al. |
| 2019/0179490 A1 | 6/2019 | Barday et al. |
| 2019/0215331 A1 | 7/2019 | Anakata et al. |
| 2019/0238439 A1 | 8/2019 | Pugh et al. |
| 2019/0297106 A1* | 9/2019 | Geil .................... H04L 63/1433 |
| 2019/0303574 A1 | 10/2019 | Lamay et al. |
| 2019/0362280 A1 | 11/2019 | Vescio |
| 2019/0379632 A1 | 12/2019 | Dahlberg et al. |
| 2019/0391707 A1 | 12/2019 | Ristow et al. |
| 2019/0392252 A1 | 12/2019 | Fighel et al. |
| 2020/0012794 A1 | 1/2020 | Saldanha et al. |
| 2020/0053127 A1 | 2/2020 | Brotherton et al. |
| 2020/0065213 A1 | 2/2020 | Poghosyan et al. |
| 2020/0074084 A1 | 3/2020 | Dorrans et al. |
| 2020/0092172 A1 | 3/2020 | Kumaran et al. |
| 2020/0097845 A1 | 3/2020 | Shaikh et al. |
| 2020/0106798 A1 | 4/2020 | Lin |
| 2020/0125734 A1 | 4/2020 | Light et al. |
| 2020/0183655 A1 | 6/2020 | Barday et al. |
| 2020/0272763 A1 | 8/2020 | Brannon et al. |
| 2020/0285737 A1 | 9/2020 | Kraus et al. |
| 2020/0356689 A1 | 11/2020 | McEnroe et al. |
| 2020/0356695 A1 | 11/2020 | Brannon et al. |
| 2021/0064746 A1 | 3/2021 | Koide et al. |

OTHER PUBLICATIONS

Search Query Report from IP.com (performed Dec. 9, 2022) (Year: 2022).*
15/271,655 Published as: US2018/0083999, Self-Published Security Risk Management, filed Sep. 21, 2016.
15/377,574 U.S. Pat. No. 9,705,932, Methods and Systems for Creating, De-Duplicating, and Accessing Data Using an Object Storage System, filed Dec. 13, 2016.
14/021,585 U.S. Pat. No. 9,438,615 Published as: US2015/0074579, Security Risk Management, filed Sep. 9, 2013.
15/216,955 Published as: US2016/0330231, Methods for Using Organizational Behavior for Risk Ratings, filed Jul. 22, 2016.
15/239,063 Published as: US2017/0093901, Security Risk Management, filed Aug. 17, 2016.
U.S. Appl. No. 17/069,151, Information Technology Security Assessment System, filed Oct. 13, 2020.
U.S. Appl. No. 29/599,622, Computer Display With Security Ratings Graphical User Interface, filed Apr. 5, 2017.
U.S. Appl. No. 29/599,620, Computer Display With Security Ratings Graphical User Interface, filed Apr. 5, 2017.
U.S. Appl. No. 16/015,686, Methods for Mapping IP Addresses and Domains to Organizations Using User Activity Data, filed Jun. 22, 2018.
U.S. Appl. No. 16/543,075, Methods for Mapping IP Addresses and Domains to Organizations Using User Activity Data, filed Aug. 16, 2019.
U.S. Appl. No. 16/738,825, Methods for Mapping IP Addresses and Domains to Organizations Using User Activity Data, filed Jan. 9, 2020.
U.S. Appl. No. 17/146,064, Methods for Mapping IP Addresses and Domains to Organizations Using User Activity Data, filed Jan. 11, 2021.
U.S. Appl. No. 15/918,286, Correlated Risk in Cybersecurity, filed Mar. 12, 2018.
U.S. Appl. No. 16/292,956, Correlated Risk in Cybersecurity, filed May 5, 2019.
U.S. Appl. No. 16/795,056, Correlated Risk in Cybersecurity, filed Feb. 19, 2020.
U.S. Appl. No. 16/170,680, Systems and Methods for Remote Detection of Software Through Browser Webinjects, filed Oct. 25, 2018.
U.S. Appl. No. 16/688,647, Systems and Methods for Remote Detection of Software Through Browser Webinjects, filed Nov. 19, 2019.
U.S. Appl. No. 17/000,135, Systems and Methods for Remote Detection of Software Through Browser Webinjects, filed Aug. 21, 2020.
U.S. Appl. No. 15/954,921, Systems and Methods for External Detection of Misconfigured Systems, filed Apr. 17, 2018.
U.S. Appl. No. 17/014,495, Systems and Methods for External Detection of Misconfigured Systems, filed Sep. 8, 2020.
U.S. Appl. No. 16/549,764, Systems and Methods for Inferring Entity Relationships via Network Communications of Users or User Devices, filed Aug. 23, 2019.
U.S. Appl. No. 16/787,650, Systems and Methods for Inferring Entity Relationships via Network Communications of Users or User Devices, filed Feb. 11, 2020.
U.S. Appl. No. 16/583,991, Systems and Methods for Network Asset Discovery and Association Thereof With Entities, filed Sep. 26, 2019.
U.S. Appl. No. 17/085,550, Systems and Methods for Network Asset Discovery and Association Thereof With Entities, filed Oct. 30, 2020.
U.S. Appl. No. 29/666,942, Computer Display With Graphical User Interface, filed Oct. 17, 2018.
U.S. Appl. No. 16/360,641, Systems and Methods for Forecasting Cybersecurity Ratings Based on Event-Rate Scenarios, filed Mar. 21, 2019.
U.S. Appl. No. 16/514,771, Systems and Methods for Generating Security Improvement Plans for Entities, filed Jul. 17, 2019.
U.S. Appl. No. 16/922,672, Systems and Methods for Generating Security Improvement Plans for Entities, filed Jul. 7, 2020.
U.S. Appl. No. 17/307,577, Systems and Methods for Generating Security Improvement Plans for Entities, filed May 4, 2021.
U.S. Appl. No. 29/677,306, Computer Display With Corporate Hierarchy Graphical User Interface Computer Display With Corporate Hierarchy Graphical User Interface, filed Jan. 18, 2019.
U.S. Appl. No. 16/775,840, Systems and Methods for Assessing Cybersecurity State of Entities Based on Computer Network Characterization, filed Jan. 29, 2020.
U.S. Appl. No. 17/018,587, Systems and Methods for Assessing Cybersecurity State of Entities Based on Computer Network Characterization, filed Sep. 11, 2020.
U.S. Appl. No. 17/132,512, Systems and Methods for Rapidly Generating Security Ratings, filed Dec. 23, 2020.
U.S. Appl. No. 16/779,437, Systems and Methods for Rapidly Generating Security Ratings, filed Jan. 31, 2020.
U.S. Appl. No. 17/119,822, Systems and Methods for Cybersecurity Risk Mitigation and Management, filed Dec. 11, 2020.
U.S. Appl. No. 16/802,232, Systems and Methods for Improving a Security Profile of an Entity Based on Peer Security Profiles, filed Feb. 26, 2020.
U.S. Appl. No. 16/942,452, Systems and Methods for Improving a Security Profile of an Entity Based on Peer Security Profiles, filed Jul. 29, 2020.

(56) References Cited

OTHER PUBLICATIONS

U.S. Appl. No. 29/736,641, Computer Display With Peer Analytics Graphical User Interface, filed Jun. 2, 2020.
U.S. Appl. No. 17/039,675, Systems and Methods for Determining Asset Importance in Security Risk Management, filed Sep. 30, 2020.
U.S. Appl. No. 17/320,997, Systems and Methods for Determining Asset Importance in Security Risk Management, filed May 14, 2021.
U.S. Appl. No. 16/884,607, Systems and Methods for Managing Cybersecurity Alerts, filed May 27, 2020.
U.S. Appl. No. 17/236,594, Systems and Methods for Managing Cybersecurity Alerts, filed Apr. 21, 2021.
"Agreed Upon Procedures," Version 4.0, BITS, The Financial Institution Shared Assessments Program, Assessment Guide, Sep. 2008, 56 pages.
"An Executive View of IT Governance," IT Governance Institute, 2009, 32 pages.
"Assessing Risk in Turbulent Times," A Workshop for Information Security Executives, Glassmeyter/McNamee Center for Digital Strategies, Tuck School of Business at Dartmouth, Institute for Information Infrastructure Protection, 2009, 17 pages.
"Assuring a Trusted and Resilient Information and Communications Infrastructure," Cyberspace Policy Review, May 2009, 76 pages.
"Creating Transparency with Palantir," accessed on the internet at https://www.youtube.com/watch?v=8cbGChfagUA; Jul. 5, 2012; 1 page.
"Gephi (gephi.org)," accessed on the internet at https://web.archive.org/web/20151216223216/https://gephi.org/; Dec. 16, 2015; 1 page.
"Master Security Criteria," Version 3.0, BITS Financial Services Security Laboratory, Oct. 2001, 47 pages.
"Mile 2 CPTE Maltego Demo," accessed on the internet at https://www.youtube.com/watch?v=02oNKOUzP0U; Jul. 12, 2012; 1page.
"Neo4j (neo4j.com)," accessed on the internet at https://web.archive.org/web/20151220150341/http://neo4j.com:80/developer/guide-data-visualization/; Dec. 20, 2015; 1 page.
"Palantir Cyber: Uncovering malicious behavior at petabyte scale," accessed on the internet at https://www.youtube.com/watch?v=EhYezV06EE; Dec. 21, 2012; 1 page.
"Palantir.com," accessed on the internet at http://www.palantir.com/; Dec. 2015; 2 pages.
"Plugging the Right Holes," Lab Notes, MIT Lincoln Library, Posted Jul. 2008, retrieved Sep. 14, 2010 from http://www.ll.miLedufpublicationsflabnotesfpluggingtherightho!. . . , 2 pages.
"Report on Controls Placed in Operation and Test of Operating Effectiveness," EasCorp, Jan. 1 through Dec. 31, 2008, prepared by Crowe Horwath, 58 pages.
"Shared Assessments: Getting Started," BITS, 2008, 4 pages.
"Twenty Critical Controls for Effective Cyber Defense: Consensus Audit," Version 2.3, Nov. 13, 2009, retrieved on Apr. 9, 2010 from http://www.sans.org/critical-security-controls/print.php., 52 pages.
Application as filed, and pending claims of U.S. Appl. No. 13/240,572.
Artz, Michael Lyle, "NetSPA: a Network Security Planning Architecture," Massachusetts Institute of Technology, May 24, 2002, 97 pages.
Azman, Mohamed et al. Wireless Daisy Chain and Tree Topology Networks for Smart Cities. 2019 IEEE International Conference on Electrical, Computer and Communication Technologies (ICECCT). https://ieeexplore.ieee.org/stamp/stamp.jsp?tp=&arnumber=8869252 (Year: 2019).
Basinya, Evgeny A.; Yushmanov, Anton A. Development of a Comprehensive Security System. 2019 Dynamics of Systems, Mechanisms and Machines (Dynamics). https://ieeexplore.ieee.org/stamp/stamp.jsp?tp=&arnumber=8944700 (Year: 2019).
Bhilare et al., "Protecting Intellectual Property and Sensitive Information in Academic Campuses from Trusted Insiders: Leveraging Active Directory", SIGUCC, Oct. 2009 (5 pages).
BitSight, "Cyber Security Myths Versus Reality: How Optimism Bias Contributes to Inaccurate Perceptions of Risk", Jun. 2015, Dimensional Research, pp. 1-9.
Borgatti, et al., "On Social Network Analysis in a Supply Chain Context," Journal of Supply Chain Management; 45(2): 5-22; Apr. 2009, 18 pages.
Boyer, Stephen, et al., Playing with Blocks: SCAP-Enable Higher-Level Analyses, MIT Lincoln Laboratory, 5th Annual IT Security Automation Conference, Oct. 26-29, 2009, 35 pages.
Buckshaw, Donald L., "Use of Decision Support Techniques for Information System Risk Management," submitted for publication in Wiley's Encyclopedia of Quantitative Risk Assessment in Jan. 2007, 11 pages.
Buehler, Kevin S., et al., "Running with risk," The McKinsey Quarterly, No. 4, 2003, pp. 40-49.
Camelo, "Botnet Cluster Identification," Sep. 2014, 2 pages.
Carstens, et al., "Modeling Company Risk and Importance in Supply Graphs," European Semantic Web Conference 2017: The Semantic Web pp. 18-31.
Chu, Matthew, et al., "Visualizing Attack Graphs, Reachability, and Trust Relationships with Navigator," MIT Lincoln Library, VizSEC '10, Ontario, Canada, Sep. 14, 2010, 12 pages.
Chuvakin, "SIEM: Moving beyond compliance", RSA White Paper (2010) (16 pages).
Computer Network Graph-Bees, http://bioteams.com/2007/04/30/visualizing_complex_networks.html, date accessed Sep. 28, 2016, 2 pages.
Computer Network Graph-Univ. of Michigan, http://people.cst.cmich.edu/liao1q/research.shtml, date accessed Sep. 28, 2016, 5 pagse.
Crowther, Kenneth G., et al., "Principles for Better Information Security through More Accurate, Transparent Risk Scoring," Journal of Homeland Security and Emergency Management, vol. 7, Issue 1, Article 37, 2010, 20 pages.
Davis, Lois M., et al., "The National Computer Security Survey (NCSS) Final Methodology," Technical report prepared for the Bureau of Justice Statistics, Safety and Justice Program, RAND Infrastructure, Safety and Environment (ISE), 2008, 91 pages.
Dun & Bradstreet Corp. Stock Report, Standard & Poor's, Jun. 6, 2009, 8 pages.
Edmonds, Robert, "ISC Passive DNS Architecture", Internet Systems Consortium, Inc., Mar. 2012, 18 pages.
Equifax Inc. Stock Report, Standard & Poor's, Jun. 6, 2009, 8 pages.
Gilgur, et al., "Percentile-Based Approach to Forecasting Workload Growth" Proceedings of CMG'15 Performance and Capacity International Conference by the Computer Measurement Group. No. 2015 (Year:2015), 16 pages.
Gundert, Levi, "Big Data in Security—Part III: Graph Analytics," accessed on the Internet at https://blogs.cisco.com/security/big-data-in-security-part-iii-graph-analytics; Cisco Blog, Dec. 2013, 8 pages.
Hachem, Sara; Toninelli, Alessandra; Pathak, Animesh; Issany, Valerie. Policy-Based Access Control in Mobile Social Ecosystems. 2011 IEEE International Symposium on Policies for Distributed Systems and Networks (POLICY). Http://ieeexplore.ieee.org/stamp/stamp.jsp?arnumber-5976796. 8 pages.
Hacking Exposed 6, S. McClure et al., copyright 2009, 37 pages.
Ingols, Kyle, et al., "Practical Attack Graph Generation for Network Defense," MIT Lincoln Library, IEEE Computer Society, Proceedings of the 22nd Annual Computer Security Applications Conference (ACSAC'06), 2006, 10 pages.
Ingols, Kyle, et al., "Practical Experiences Using SCAP to Aggregate CND Data," MIT Lincoln Library, Presentation to NIST SCAP Conference, Sep. 24, 2008, 59 pages.
Jean, "Cyber Security: How to use graphs to do an attack analysis," accessed on the internet at https://linkurio.us/blog/cyber-security-use-graphs-attack-analysis/; Aug. 2014, 11 pages.
Jin et al., "Identifying and tracking suspicious activities through IP gray space analysis", MineNet, Jun. 12, 2007 (6 pages).
Johnson, Eric, et al., "Information Risk and the Evolution of the Security Rating Industry," Mar. 24, 2009, 27 pages.
Joslyn, et al., "Massive Scale Cyber Traffic Analysis: a Driver for Graph Database Research," Proceedings of the First International Workshop on Graph Data Management Experience and Systems (GRADES 2013), 6 pages.

(56) References Cited

OTHER PUBLICATIONS

Kc Claffy, "Internet measurement and data analysis: topology, workload, performance and routing statistics," accessed on the Internet at http://www.caida.org/publications/papers/1999/Nae/Nae. html., NAE '99 workshop, 1999, 22 pages.
Li et al., "Finding the Linchpins of the Dark Web: a Study on Topologically Dedicated Hosts on Malicious Web Infrastructures", IEEE, 2013 (15 pages).
Lippmann, RP., et al., "An Annotated Review of Papers on Attack Graphs," Project Report IA-1, Lincoln Laboratory, Massachusetts Institute of Technology, Mar. 31, 2005, 39 pages.
Lippmann, RP., et al., "Evaluating and Strengthening Enterprise Network Security Using Attack Graphs," Project Report IA-2, MIT Lincoln Laboratory, Oct. 5, 2005, 96 pages.
Luo, Hui; Henry, Paul. A Secure Public Wireless LAN Access Technique That Supports Walk-up Users. GLOBECOM '03. IEEE Global Telecommunications Conference. https://ieeexplore.ieee.org/stamp/stamp.jsp?tp=&arnumber= 1258471 (Year: 2003).
Massimo Candela, "Real-time BGP Visualisation with BGPlay," accessed on the Internet at https://labs.ripe.net/Members/massimo_candela/real-time-bgp-visualisationwith-bgplay), Sep. 30, 2015, 8 pages.
McNab, "Network Security Assessment," copyright 2004, 13 pages.
Method Documentation, CNSS Risk Assessment Tool Version 1.1, Mar. 31, 2009, 24 pages.
Mile 2 CPTE Maltego Demo, accessed on the internet at https://www.youtube.com/watch?v=o2oNKOUzPOU; Jul. 12, 2012; 1 page.
Moradi, et al., "Quantitative Models for Supply Chain Management," IGI Global, 2012, 29 pages.
Morningstar Direct, dated to 11/12/202, morningstardirect.com [online]. Retrieved Feb. 26, 2021 from internet <URL:https://web.archive.org/web/20201112021943/https://www.morningstar.com/products/direct> (Year: 2020).
Netcraft, www.netcraft.com, date accessed Sep. 28, 2016, 2 pages.
NetScanTools Pro, http://www.netscantools.com/nstpromain.html, date accessed Sep. 28, 2016, 2 pages.
Network Security Assessment, C. McNab, copyright 2004, 13 pages.
Noel, et al., "Big-Data Architecture for Cyber Attack Graphs, Representing Security Relationships in NoSQL Graph Databases," The MITRE Corporation, 2014, 6 pages.
Nye, John, "Avoiding Audit Overlap," Moody's Risk Services, Presentation, Source Boston, Mar. 14, 2008, 19 pages.
Pending claims for U.S. Appl. No. 14/021,585.
U.S. Appl. No. 13/240,572 and pending claims.
U.S. Appl. No. 13/240,572, application as filed and pending claims.
U.S. Appl. No. 14/021,585 and pending claims.
U.S. Appl. No. 14/021,585.
U.S. Appl. No. 14/944,484 and pending claims.
U.S. Appl. No. 61/386,156.
Application as filed and pending claims for U.S. Appl. No. 13/240,572.
Application as filed and pending claims for U.S. Appl. No. 14/944,484.
Paxson, Vern, "How the Pursuit of Truth Led Me to Selling Viagra," EECS Department, University of California, International Computer Science Institute, Lawrence Berkeley National Laboratory, Aug. 13, 2009, 68 pages.
Proposal and Award Policies and Procedures Guide, Part 1—Proposal Preparation & Submission Guidelines GPG, The National Science Foundation, Feb. 2009, 68 pages.
Provos et al., "The Ghost in the Browser Analysis of Web-based Malware", 2007 (9 pages).
Rare Events, Oct. 2009, JASON, The MITRE Corporation, Oct. 2009, 104 pages.
Report to the Congress on Credit Scoring and Its Effects on the Availability and Affordability of Credit, Board of Governors of the Federal Reserve System, Aug. 2007, 304 pages.
RFC 1834, https://tools.ietf.org/html/rfc1834, date accessed Sep. 28, 2016, 7 pages.
RFC 781, https://tools.ietf.org/html/rfc781, date accessed Sep. 28, 2016, 3 pages.
RFC 950, https://tools.ietf.org/html/rfc950, date accessed Sep. 28, 2016, 19 pages.
RFC 954, https://tools.ietf.org/html/rfc954, date accessed Sep. 28, 2016, 5 pages.
SamSpade Network Inquiry Utility, https://www.sans.org/reading-room/whitepapers/tools/sam-spade-934, date accessed Sep. 28, 2016, 19 pages.
SBIR Phase I: Enterprise Cyber Security Scoring, CyberAnalytix, LLC, http://www.nsf.gov/awardsearch/showAward.do?AwardNumber=I013603, Apr. 28, 2010, 2 pages.
Search Query Report form IP.com (performed Apr. 27, 2020).
Seigneur et al., A Survey of Trust and Risk Metrics for a BYOD Mobile Worker World: Third International Conference on Social Eco-Informatics, 2013, 11 pages.
Seneviratne et al., "SSIDs in the Wild: Extracting Semantic Information from WiFi SSIDs" HAL archives-ouvertes.fr, HAL Id: hal-01181254, Jul. 29, 2015, 5 pages.
Snort Intrusion Monitoring System, http://archive.oreilly.com/pub/h/1393, date accessed Sep. 28, 2016, 3 pages.
Srivastava, Divesh; Velegrakis, Yannis. Using Queries to Associate Metadata with Data. IEEE 23rd International Conference on Data Engineering. Pub. Date: 2007. http://ieeexplore.ieee.org/stamp/stamp.jsp?arnumber=4221823, 3 pages.
Taleb, Nassim N., et al., "The Six Mistakes Executives Make in Risk Management," Harvard Business Review, Oct. 2009, 5 pages.
The CIS Security Metrics v1.0.0, the Center for Internet Security, May 11, 2009, 90 pages.
The Dun & Bradstreet Corp. Stock Report, Standard & Poor's, Jun. 6, 2009, 8 pages.
The Fair Credit Reporting Act (FCRA) of the Federal Trade Commission (FTC), Jul. 30, 2004, 86 pages.
The Financial Institution Shared Assessments Program, Industry Positioning and Mapping Document, BITS, Oct. 2007, 44 pages.
Wagner, et al., "Assessing the vulnerability of supply chains using graph theory," Int. J. Production Economics 126 (2010) 121-129.
Wikipedia, https://en.wikipedia.org/wiki/Crowdsourcing, date accessed Sep. 28, 2016, 25 pages.
Williams, Leevar, et al., "GARNET: a Graphical Attack Graph and Reachability Network Evaluation Tool," MIT Lincoln Library, VizSEC 2009, pp. 44-59.
U.S. Appl. No. 15/216,955 Published as: US2016/0330231, Methods for Using Organizational Behavior for Risk Ratings, filed Jul. 22, 2016.
U.S. Appl. No. 15/239,063 Published as: US2017/0093901, Security Risk Management, filed Aug. 17, 2016.
U.S. Appl. No. 16/405,121 Published as: US2019/0260791, Methods for Using Organizational Behavior for Risk Ratings, filed May 7, 2019.
U.S. Appl. No. 17/025,930, Methods for Using Organizational Behavior for Risk Ratings, filed Sep. 18, 2020.
U.S. Appl. No. 13/240,572 Published as: US2016/0205126, Information Technology Security Assessment System, filed Sep. 22, 2011.
U.S. Appl. No. 15/044,952 Published as: US2017/0236077, Relationships Among Technology Assets and Services and the Entities Responsible for Them, filed Feb. 16, 2016.
U.S. Appl. No. 16/015,686 U.S. Pat. No. 10,425,380, Methods for Mapping IP Addresses and Domains to Organizations Using User Activity Data, filed Jun. 22, 2018.
U.S. Appl. No. 16/543,075 U.S. Pat. No. 10,554,619, Methods for Mapping IP Addresses and Domains to Organizations Using User Activity Data, filed Aug. 16, 2019.
U.S. Appl. No. 16/738,825 U.S. Pat. No. 10,893,021, Methods for Mapping IP Addresses and Domains to Organizations Using User Activity Data, filed Jan. 9, 2020.
U.S. Appl. No. 15/918,286 U.S. Pat. No. 10,257,2109, Correlated Risk in Cybersecurity, filed Mar. 12, 2018.
U.S. Appl. No. 16/292,956 U.S. Pat. No. 10,594,723, Correlated Risk in Cybersecurity, filed Mar. 5, 2019.
U.S. Appl. No. 16/795,056 U.S. Pat. No. 10,931,705, Correlated Risk in Cybersecurity, filed Feb. 19, 2020.

(56) References Cited

OTHER PUBLICATIONS

U.S. Appl. No. 16/688,647 U.S. Pat. No. 10,776,483, Systems and Methods for Remote Detection of Software Through Browser Webinjects, filed Nov. 19, 2019.
U.S. Appl. No. 17/000,135 U.S. Pat. No. 11,126,723, Systems and Methods for Remote Detection of Software Through Browser Webtnjects, filed Aug. 21, 2020.
U.S. Appl. No. 15/954,921 U.S. Pat. No. 10,812,520, Systems and Methods for External Detection of Misconfigured Systems, filed Apr. 17, 2018.
U.S. Appl. No, 16/360,641 U.S. Pat. No. 11,200,323, Systems and Methods for Forecasting Cybersecurity Ratings Based on Event-Rate Scenarios, filed Mar. 21, 2019.
U.S. Appl. No. 16/922,673 U.S. Pat. No. 11,030,325, Systems and Methods for Generating Security Improvement Plans for Entities, filed Jul. 7, 2020.
U.S. Appl. No. 17/307,577 Published as: US2021/0326449, Systems and Methods for Generating Security Improvement Plans for Entities, filed May 4, 2021.
U.S. Appl. No. 16/942,452 U.S. Pat. No. 11,265,330, Systems and Methods for Improving a Security Profile of an Entity Based on Peer Security Profiles, filed Jul. 29, 2020.
U.S. Appl. No. 29/736,641 U.S. Pat. No. D.937,870, Computer Display With Peer Analytics Graphical User Interface, filed Jun. 2, 2020.
U.S. Appl. No. 17/710,168, Systems and Methods for Assessing Cybersecurity Risk in a Work From Home Environment, filed Mar. 31, 2022.
U.S. Appl. No. 17/856,217, Systems and Methods for Accelerating Cybersecurity Assessments, filed Jul. 1, 2022.
2009 Data Breach Investigations Report, study conducted by Verizon Business RISK Team, 52 pages.
Camelo, "Condenser: a Graph-based Approach for Detecting Botnets," AnubisNetworks R&D, Amadora, Portugal and CENTRIA, Universidade NOVA de Lisboa, Portugal (pp. 8) Oct. 31, 2014.
Chernyshev, M. et al., "On 802.11 Access Point Locatability and Named Entity Recognition in Service Set Identifiers", IEEE Trans. on Info. and Sec., vol. 11 No. 3 (Mar. 2016).
McNab, "Network Security Assessment," copyright 2004, 56 pages.
Rees, L. P. et al., "Decision support for cybersecurity risk planning." Decision Support Systems 51.3 (2011):pp. 493-505.
Santos, J. R. et al., "A framework for linking cybersecurity metrics to the modeling of macroeconomic interdependencies." Risk Analysis: an International Journal (2007) 27.5, pp. 1283-1297.
Winship, C., "Models for sample selection bias", Annual review of sociology, 18(1) (Aug. 1992), pp. 327-350.
U.S. Appl. No. 15/271,655 Published as: US 2018/0083999, Self-Published Security Risk Management, filed Sep. 21, 2016.
U.S. Appl. No. 15/377,574 U.S. Pat. No. 9,705,932, Methods and Systems for Creating, De-Duplicating, and Accessing Data Using an Object Storage System, filed Dec. 13, 2016.
U.S. Appl. No. 14/021,585 U.S. Pat. No. 9,438,615 Published as: US2015/0074579, Security Risk Management, filed Sep. 9, 2013.
U.S. Appl. No. 15/216,955 U.S. Pat. No. 10,326,786 Published as: US 2016/0330231, Methods for Using Organizational Behavior for Risk Ratings, filed Jul. 22, 2016.
U.S. Appl. No. 15/239,063 U.S. Pat. No. 10,341,370 Published as: US2017/0093901, Security Risk Management, filed Aug. 17, 2016.
U.S. Appl. No. 16/405,121 U.S. Pat. No. 10,785,245 Published as: US2019/0260791, Methods for Using Organizational Behavior for Risk Ratings, filed May 7, 2019.
U.S. Appl. No. 17/025,930 Published as: US2021/0006581, Methods for Using Organizational Behavior for Risk Ratings, filed Sep. 18, 2020.
U.S. Appl. No. 13/240,572 U.S. Pat. No. 10,805,331 Published as: US2016/0205126, Information Technology Security Assessment System, filed Sep. 22, 2011.
U.S. Appl. No. 14/944,484 U.S. Pat. No. 9,973,524 Published as: US2016/0323308, Information Technology Security Assessment System, filed Nov. 18, 2015.
U.S. Appl. No. 17/069,151 Published as: US2021/0211454, Information Technology Security Assessment System, filed Oct. 13, 2020.
U.S. Appl. No. 15/142,677 U.S. Pat. No. 9,830,569 Published as: US2016/0239772, Security Assessment Using Service Provider Digital Asset Information, filed Apr. 29, 2016.
U.S. Appl. No. 15/134,845 U.S. Pat. No. 9,680,858, Annotation Platform for a Security Risk System, filed Apr. 21, 2016.
U.S. Appl. No. 15/044,952 U.S. Pat. No. 11,182,720 Published as: US2017/0236077, Relationships Among Technology Assets and Services and the Entities Responsible for Them, filed Feb. 16, 2016.
U.S. Appl. No. 15/089,375 U.S. Pat. No. 10,176,445 Published as: US2017/0236079, Relationships Among Technology Assets and Services and the Entities Responsible for Them, filed Apr. 1, 2016.
U.S. Appl. No. 29/598,298 U.S. Pat. No. D.835,631, Computer Display Screen With Graphical User Interface, filed Mar. 24, 2017.
U.S. Appl. No. 29/598,299 U.S. Pat. No. D.818,475, Computer Display With Security Ratings Graphical User Interface, filed Mar. 24, 2017.
U.S. Appl. No. 29/599,622 U.S. Pat. No. D.847169, Computer Display With Security Ratings Graphical User Interface, filed Apr. 5, 2017.
U.S. Appl. No. 29/599,620 U.S. Pat. No. D.846,562, Computer Display With Security Ratings Graphical User Interface, filed Apr. 5, 2017.
U.S. Appl. No. 16/015,686 U.S. Pat. No. 10,425,380 Published as: US2018/0375822, Methods for Mapping IP Addresses and Domains to Organizations Using User Activity Data, filed Jun. 22, 2018.
U.S. Appl. No. 16/543,075 U.S. Pat. No. 10,554,619 Published as: US2019/0379632, Methods for Mapping IP Addresses and Domains to Organizations Using User Activity Data, filed Aug. 16, 2019.
U.S. Appl. No. 16/738,825 U.S. Pat. No. 10,893,021 Published as: US2020/0153787, Methods for Mapping IP Addresses and Domains to Organizations Using User Activity Data, filed Jan. 9, 2020.
U.S. Appl. No. 17/146,064 Published as: US2021/0218702, Methods for Mapping IP Addresses and Domains to Organizations Using User Activity Data, filed Jan. 11, 2021.
U.S. Appl. No. 15/918,286 U.S. Pat. No. 10,257,219, Correlated Risk in Cybersecurity, filed Mar. 12, 2018.
U.S. Appl. No. 16/292,956 U.S. Pat. No. 10,594,723 Published as: US2019/0297106, Correlated Risk in Cybersecurity, filed Mar. 5, 2019.
U.S. Appl. No. 16/795,056 U.S. Pat. No. 10,931,705 Published as: US2020/0195681, Correlated Risk in Cybersecurity, filed Feb. 19, 2020.
U.S. Appl. No. 16/170,680 U.S. Pat. No. 10,521,583, Systems and Methods for Remote Detection of Software Through Browser Webinjects, filed Oct. 25, 2018.
U.S. Appl. No. 16/688647 U.S. Pat. No. 10,776,483 Published as: US2020/0134174, Systems and Methods for Remote Detection of Software Through Browser Webinjects, filed Nov. 19, 2019.
U.S. Appl. No. 17/000,135 U.S. Pat. No. 11,126,723 Published as: US2021/0004457, Systems and Methods for Remote Detection of Software Through Browser Webinjects, filed Aug. 21, 2020.
U.S. Appl. No. 17/401,683 Published as: US2021/0374243, Systems and Methods for Remote Detection of Software Through Browser Webinjects, filed Aug. 13, 2021.
U.S. Appl. No. 15/954,921 U.S. Pat. No. 10,812,250 Published as: US2019/0319979, Systems and Methods for External Detection of Misconfigured Systems, filed Apr. 17, 2018.
U.S. Appl. No. 17/014,495 Published as: US2020/0404017, Systems and Methods for External Detection of Misconfigured Systems, filed Sep. 8, 2020.
U.S. Appl. No. 16/549,764 Published as: US2021/0058421, Systems and Methods for Inferring Entity Relationships via Network Communications of Users or User Devices, filed Aug. 23, 2019.
U.S. Appl. No. 16/787,650 U.S. Pat. No. 10,749,893, Systems and Methods for Inferring Entity Relationships via Network Communications of Users or User Devices, filed Feb. 11, 2020.
U.S. Appl. No. 16/583,991 U.S. Pat. No. 10,848,382, Systems and Methods for Network Asset Discovery and Association Thereof With Entities, filed Sep. 26, 2019.

(56) References Cited

OTHER PUBLICATIONS

U.S. Appl. No. 17/085,550 U.S. Pat. No. 11,329,878 Published as: US2021/0099347, Systems and Methods for Network Asset Discovery and Association Thereof With Entities, filed Oct. 30, 2020.
U.S. Appl. No. 29/666,942 U.S. Pat. No. D. 892,135, Computer Display With Graphical User Interface, filed Oct. 17, 2018.
U.S. Appl. No. 16/360,641 U.S. Pat. No. 11,200,323 Published as: US2020/0125734, Systems and Methods for Forecasting Cybersecurity Ratings Based on Event-Rate Scenarios, filed Mar. 21, 2019.
U.S. Appl. No. 17/523,166 Published as: US2022/0121753, Systems and Methods for Forecasting Cybersecurity Ratings Based on Event-Rate Scenarios, filed Nov. 10, 2021.
U.S. Appl. No. 16/514,771 U.S. Pat. No. 10,726,136, Systems and Methods for Generating Security Improvement Plans for Entities, filed Jul. 17, 2019.
U.S. Appl. No. 16/922,673 U.S. Pat. No. 11,030,325 Published as: US2021/0019424, Systems and Methods for Generating Security Improvement Plans for Entities, filed Jul. 7, 2020.
U.S. Appl. No. 17/307,577 Published as: US2021/0211454, Systems and Methods for Generating Security Improvement Plans for Entities, filed May 4, 2021.
U.S. Appl. No. 29/677,306 U.S. Pat. No. D. 905,702, Computer Display Screen With Corporate Hierarchy Graphical User Interface, filed Jan. 18, 2019.
U.S. Appl. No. 16/775,840 U.S. Pat. No. 10,791,140, Systems and Methods for Assessing Cybersecurity State of Entities Based on Computer Network Characterization, filed Jan. 29, 2020.
U.S. Appl. No. 17/018,587 U.S. Pat. No. 11,050,779, Systems and Methods for Assessing Cybersecurity State of Entities Based on Computer Network Characterization, filed Sep. 11, 2020.
U.S. Appl. No. 16/779,437 U.S. Pat. No. 10,893,067 Published as: US2021/0243221, Systems and Methods for Rapidly Generating Security Ratings, filed Jan. 31, 2020.
U.S. Appl. No. 17/132,512 Published as: US2021/0243221, Systems and Methods for Rapidly Generating Security Ratings, filed Dec. 23, 2020.
U.S. Appl. No. 18/158,594, Systems and Methods for Rapidly Generating Security Ratings, filed Jan. 24, 2023.
U.S. Appl. No. 17/119,822 U.S. Pat. No. 11,122,073, Systems and Methods for Cybersecurity Risk Mitigation and Management, filed Dec. 11, 2020.
U.S. Appl. No. 29/815,855, Computer Display With a Graphical User Interface for Cybersecurity Risk Management, filed Nov. 17, 2021.
U.S. Appl. No. 17/392,521 Published as US 2022/0191232, Systems and Methods for Cybersecurity Risk Mitigation and Management, filed Aug. 3, 2021.
U.S. Appl. No. 16/802,232 U.S. Pat. No. 10,764,298, Systems and Methods for Improving a Security Profile of an Entity Based on Peer Security Profiles, filed Feb. 26, 2020.
U.S. Appl. No. 16/942,452 U.S. Pat. No. 11,265,330 Published as: US2021/0266324, Systems and Methods for Improving a Security Profile of an Entity Based on Peer Security Profiles, filed Jul. 29, 2020.
U.S. Appl. No. 29/725,724, Computer Display With Risk Vectors Graphical User Interface, filed Feb. 26, 2020.
U.S. Appl. No. 29/736,641 U.S. Pat. No. D. 937,870, Cumputer Display With Peer Analytics Graphical User Interface, filed Jun. 2, 2020.
U.S. Appl. No. 17/039,675 U.S. Pat. No. 11,032,244 Published as: US2021/0099428, Systems and Methods for Determining Asset Importance in Security Risk Management, filed Sep. 30, 2020.
U.S. Appl. No. 17/320,997 Published as US 2021/0344647, Systems and Methods for Determining Asset Importance in Security Risk Management, filed May 14, 2021.
U.S. Appl. No. 16/884,607 U.S. Pat. No. 11,023,585, Systems and Methods for Managing Cybersecurity Alerts, filed May 27, 2020.
U.S. Appl. No. 17/236,594 Published as: US2021/0374246, Systems and Methods for Managing Cybersecurity Alerts, filed Apr. 21, 2021.
U.S. Appl. No. 17/710,168 Published as: US2022/0318400, Systems and Methods for Assessing Cybersecurity Risk in a Work From Home Environment, filed Mar. 31, 2022.
U.S. Appl. No. 17/945,337, Systems and Methods for Precomputation of Digital Asset Inventories, filed Sep. 15, 2022.
U.S. Appl. No. 17/856,217 Published as: US2023/0004655, Systems and Methods for Accelerating Cybersecurity Assessments, filed Jul. 1, 2022.
U.S. Appl. No. 18/162,154, Systems and Methods for Assessment of Cyber Resilience, filed Jan. 31, 2023.
"Amazon Mechanical Turk," accessed on the internet at https://www.mturk.com/, (Nov. 9, 2018), 7 pages.
"Computer Network Graph," http://www.opte.org, accessed on the internet at http://www.opte.org, (Nov. 9, 2018), 1 page.
"Rapid7 Nexpose Vulnerability Scanner," accessed on the internet at https://web.archive.org/web/20170520082737/https://www.rapid7.com/products/nexpose/; May 20, 2017.
"Tenable Nessus Network Vulnerability Scanner," accessed on the internet at https://www.tenable.com/products/nessus/nessus-professional, (Nov. 9, 2018), 13 paqes.
Dillon-Merrill, PhD., Robin L, et al., "Logic Trees: Fault, Success, Attack, Event, Probability, and Decision Trees," Wiley Handbook of Science and Technology for Homeland Security, 13 pages, (Mar. 15, 2009).
Ingols, Kyle, et al., "Modeling Modern Network Attacks and Countermeasures Using Attack Graphs," MIT Lincoln Laboratory, 16 pages, (Dec. 7, 2009).
Lippmann, Richard, et al., "Validating and Restoring Defense in Depth Using Attack Graphs," MIT Lincoln Laboratory, 10 pages, (Oct. 23, 2006).
Maltego XL, accessed on the Internet at https://www.paterva.com/web7/buy/maltego-clients/maltego-xl.php, 5 pages, (Nov. 7, 2018).
MaxMind, https://www.maxmind.com/en/about-maxmind, https://www.maxmind.com/en/geoip2-isp-database, date accessed Sep. 28, 2016, 3 pages.
Security Warrior, Cyrus Peikari, Anton, Chapter 8: Reconnaissance, 6 pages, (Jan. 2004).
Stone-Gross, Brett, et al., "FIRE: Finding Rogue Networks," 10 pages, (Dec. 7, 2009).
Williams, Leevar, et al., "An Interactive Attack Graph Cascade and Reachability Display," MIT Lincoln Laboratory, 17 pages, (Jan. 2007).

\* cited by examiner

CORRELATED RISK IN CYBERSECURITY

CROSS-REFERENCE TO RELATED APPLICATIONS

This application is a continuation of and claims priority to U.S. patent application Ser. No. 16/795,056, titled "Correlated Risk in Cybersecurity" and filed on Feb. 19, 2020, which is a continuation of U.S. patent application Ser. No. 16/292,956, titled "Correlated Risk in Cybersecurity" and filed on Mar. 5, 2019 now U.S. Pat. No. 10,594,723 issued on Mar. 17, 2020, which is a continuation of and claims priority to U.S. patent application Ser. No. 15/918,286, titled "Correlated Risk in Cybersecurity" and filed on Mar. 12, 2018 now U.S. Pat. No. 10,257,219 issued on Apr. 9, 2019, which are hereby incorporated by reference herein in their entireties.

TECHNICAL FIELD

The following disclosure is directed to methods and systems for quantifying correlated risk in networks and, more specifically, methods and systems for quantifying correlated risk in networks due to cybersecurity incidents.

BACKGROUND

Network-based software and services (including websites, electronic communications, software-as-a-service (SaaS) offerings, and others) rely on an increasingly large and complex set of dependencies to operate. A failure or breach of any of these dependencies can cause service disruptions, outages, and other negative outcomes for the services that depend on them (directly or indirectly), resulting in loss of business continuity or other financial harm to the organizations that operate them.

There are many possible kinds of dependencies. One major category is service providers. These include (but are not limited to) hosting providers, domain name systems (DNS), content delivery networks (CDN), cloud infrastructure, managed Web servers, email services, payment processors, certificate authorities, and analytics and monitoring.

A second category includes components used to build and operate products and services. These include (but are not limited to) operating systems, application servers, code libraries, databases, networking systems, and hardware. A systematic fault in one of these components can simultaneously affect large numbers of services that use the component. For example, a bug in the Linux kernel related to leap seconds caused widespread disruption in 2012.

A third—and less obvious—category consists of software defects and malicious software. Although these are not intentional dependencies, they, too, can pose significant aggregate risk. For example, a wide-scale ransomware attack has the potential to disrupt large numbers of software services and businesses.

Dependency relationships are often not immediately apparent. For example, if Web site A is hosted on hosting provider B, and hosting provider B uses a domain-name service (DNS) provider C, a failure of C can lead to a failure of A, even though no direct business or technical relationship—only a transitive one—exists between A and C.

Furthermore, large numbers of services (and businesses) may rely on a single dependency (direct or transitive). A failure of that dependency can thus cause surprisingly widespread disruptions. These dependencies therefore create aggregate risk (also known as correlated risk) from the point of view of a business operating multiple services or service instances, or from the point of view of an organization with a financial interest in a portfolio of businesses (e.g., insurance or investments).

Many methods of reliability and risk analysis assume that failures are uncorrelated and independent, because this greatly simplifies the analysis. However, because of the above points, this assumption often leads to inaccuracies and/or understated risks in networked environments. There is a current need for methods of identifying dependencies and other risk factors which pose high levels of aggregate risk, and of quantifying this risk.

SUMMARY

Methods and systems are described herein to identify such dependencies that may be the sources of risk and accurately quantify that risk. The methods include capturing the relationships among entities (such as organizations or companies), their assets, and the dependencies that pose risks to the operation of those assets. These relationships can be identified via a dependency graph. The dependency graph may also include portfolio level nodes to aid risk managers in identifying risk in a collection across multiple entities—even if those entities are not directly related. Note that the assets may be weighted by their importance to their owners, based on traffic data and other metrics. Risk is evaluated and quantified by carrying out repeated sampling and probabilistic simulations (e.g., Monte Carlo trials) over the dependency graph. In each simulation, a seed event is generated representing a disruption caused by the failure of a dependency (or the occurrence of a botnet attack, software defect, or other systemic effect). Next, the disruption caused by the seed event is propagated probabilistically though the graph. Once propagation is complete, the loss is assessed for each asset, and the aggregate losses are accumulated at the entity and portfolio levels. Statistics are gathered from the collection of individual runs.

In accordance with an embodiment of the disclosure, a computer-implemented method is provided for quantifying correlated risk in a network of assets having one or more dependencies, where each asset belongs to at least one entity. The method includes generating a dependency graph based on relationships between the assets, at least one dependency, and at least one entity, and executing Monte Carlo simulations over the dependency graph, including generating a seed event in the dependency graph, where the seed event has a probability distribution, and propagating disruption through the dependency graph based on the seed event. An estimated loss is assessed for each of the assets, which may be aggregated across multiple assets to determine correlated risk in the network.

In a related embodiment, the assets are selected from a group consisting of: Internet Protocol (IP) address, domain name, and server system; and each entity may be a company or an organization. The dependencies may result from using a hosting provider and/or a software version. Optionally, the method includes receiving information indicative of the relationships between the plurality of assets, at least one dependency, and at least one entity.

In another related embodiment, the method includes storing information indicative of the relationships among the assets, the dependencies, and at the entities in a database, wherein the information is at least one of the group consisting of: domain name system (DNS) record, server banner, traffic data, malware infection, and software version. Optionally, the method includes observing traffic to and from a particular asset in the network to identify at least one of (i) an entity and (ii) a dependency related to the particular asset.

In a further related embodiment, each of the assets may be weighted according to its importance to an entity owning, controlling or using the asset. Optionally, the dependency graph includes (i) edges representing relationships among the assets, at least one dependency, and at least one entity and (ii) nodes representing the assets, at least one dependency, and at least one entity, wherein each edge has a conditional probability that the asset on a receiving node of a particular edge is compromised given that the providing node is compromised.

In yet another related embodiment, propagating disruption through the dependency graph may continue through the dependency graph until a threshold number of nodes is affected, such as a threshold amount of loss aggregated among assets. Optionally or alternatively, the seed event may be a breach or failure of the at least one dependency. In a related embodiment, the probability distribution is a probability that the asset will become unavailable if the dependency fails. In a further related embodiment, the method may include storing information related to the aggregated losses in a database.

In another related embodiment, the entity includes at least two entities, and a first asset belongs to a first entity and a second asset belongs to a second entity. In a related embodiment, at least one of the assets belongs to another entity of the entities. Optionally, the method includes aggregating losses for two or more entities to determine correlated risk in the network. In a related embodiment, the method includes storing information related to the aggregated losses for the two or more entities in a database. Optionally, each of the at least two entities is assigned to at least one portfolio, and wherein the method further includes aggregating losses for two or more portfolios to determine correlated risk in the network. Optionally or alternatively, the method includes storing information related to the aggregated losses for the two or more portfolios in a database.

In a related embodiment, the aggregating losses for two or more assets to determine correlated risk in the network further includes aggregating losses in a nonlinear sum for the two or more assets. In another related embodiment, a number of the plurality of Monte Carlo simulations is selected to reduce a statistical variance of the plurality of Monte Carlo simulations. Optionally, the execution of Monte Carlo simulations over the dependency graph further includes determining if a statistical variance is equal to or less than a threshold, and terminating the Monte Carlo simulations if the statistical variance is equal to or less than the threshold.

DETAILED DESCRIPTION

Described herein are methods and systems that enable the identification and quantification of aggregate risk posed to entities and portfolios of entities by dependencies and other risk factors. In the following, FIGS. 1-4 are described together for clarity purposes.

Identifying Relationships

Figure 1A:
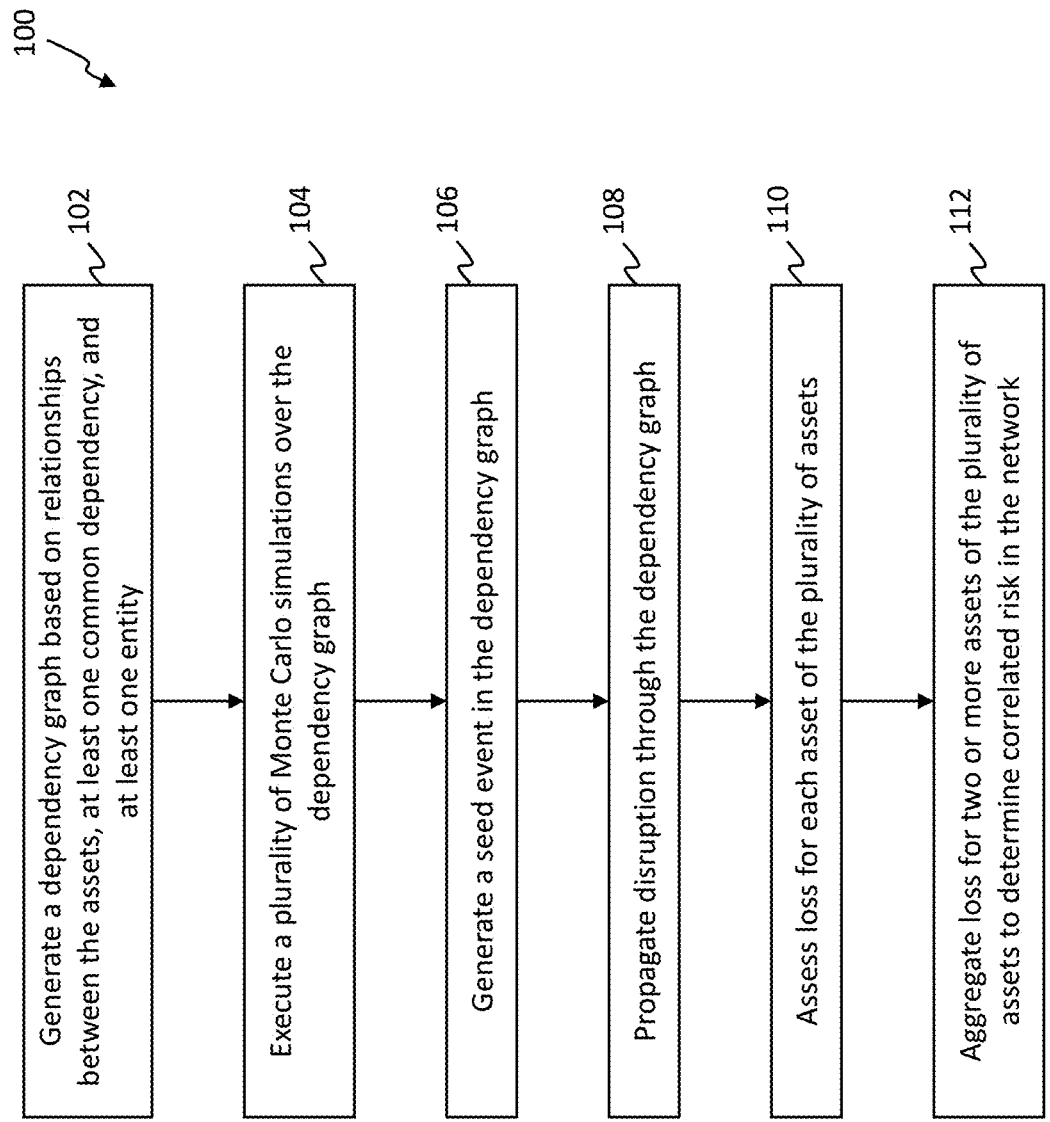
FIGS. 1A-1B are flowcharts of exemplary computer-implemented methods for quantifying correlated risk in a network.
Figure 1B:
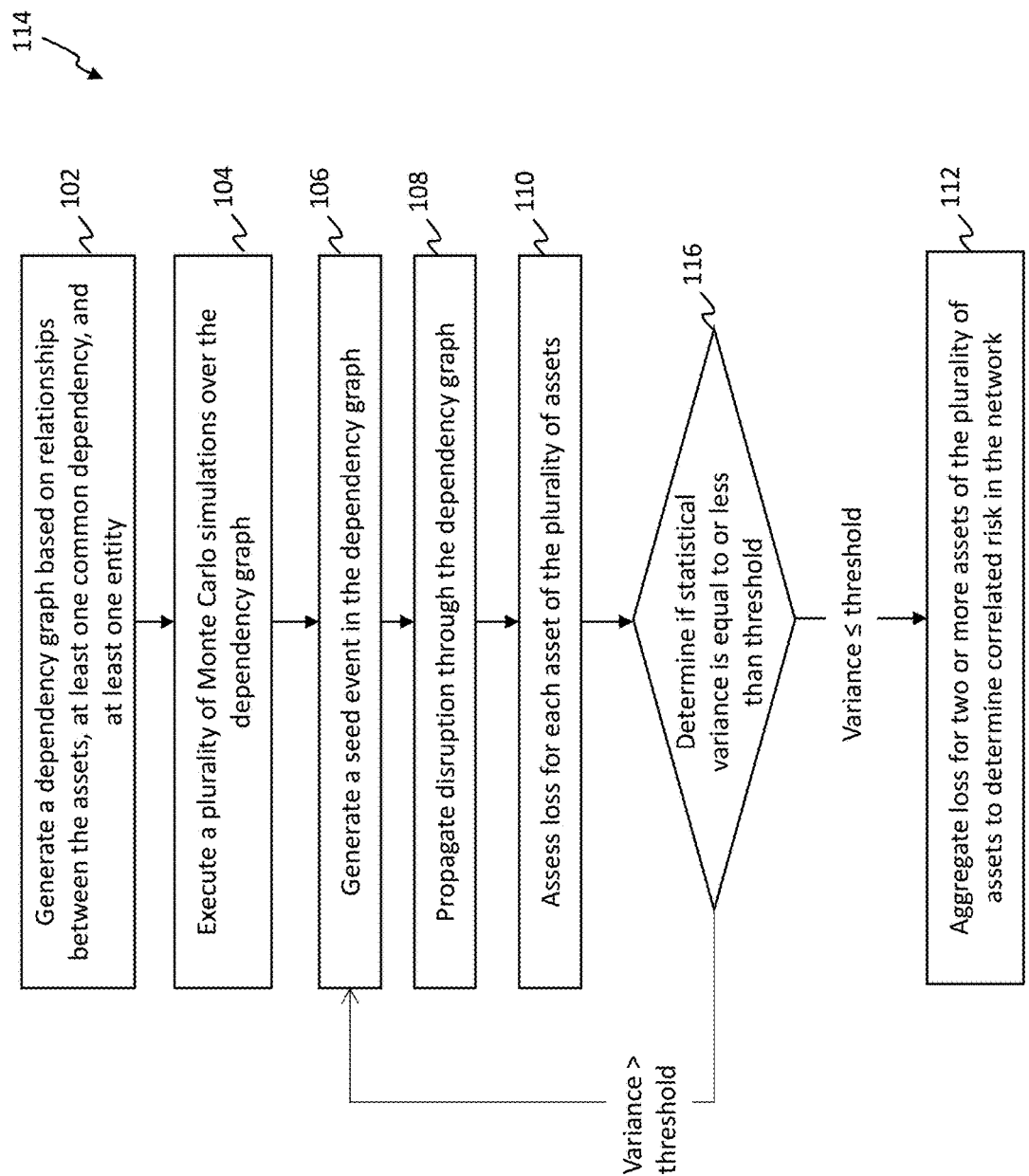

FIG. 1A is a flowchart of an exemplary computer-implemented method 100 for quantifying correlated risk in a network. An exemplary network includes a plurality of assets, at least one dependency, and at least one entity. In process 102, a processor (such as processor 408, 410, and/or 412 illustrated in FIG. 4) can generate a dependency graph based on relationships among the plurality of assets, the at least one dependency, and the at least one entity, as detailed below. Optionally, the dependency graph can include at least one portfolio containing the at least one entity, as detailed below. In other embodiments, the processor stores or defines information related to the relationships among the different constituents (assets, dependency or dependencies, entity or entities, portfolio(s)) in a table, relational database, or flat file instead of a graph.

Figure 2:
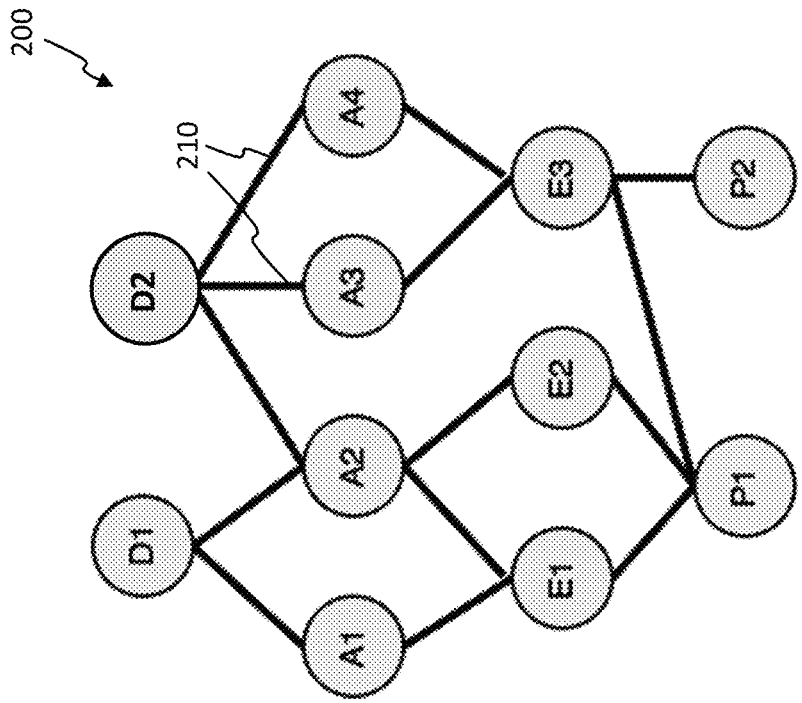
FIG. 2 is a schematic diagram of an exemplary network of plurality of assets, at least one dependency, at least one entity, and at least one portfolio.
Figure 2:
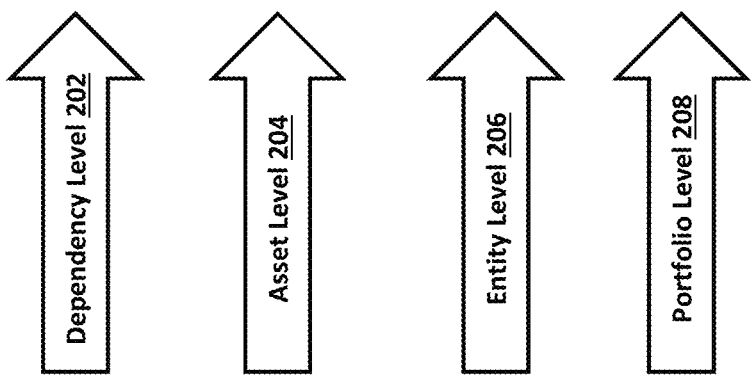

FIG. 2 is a schematic diagram of an exemplary dependency graph 200 of plurality of assets (A(n+1)), at least one dependency (Dn), at least one entity (En), and at least one portfolio (Pn), wherein n is any natural number {1, 2, 3, . . . }. Dependency level 202 includes at least one dependency D1, D2 (e.g., hosting providers or software version). Asset level 204 includes the plurality of assets A1-A4 (e.g., domain names, servers, Internet Protocol (IP) addresses, hosts, etc.) belonging to one or more entities E1-E3. The edges 210 between the dependency and asset levels 202, 204 indicate a dependency relationship involving the asset and the dependency. For example, A1 and A2 are dependent on same dependency D1 while A2 is also dependent on D2. Thus, each asset An may have one or more dependency Dn. The assets are each weighted by their importance to their owners (entities), based on traffic data and other metrics. Importance may be assessed in terms of financial impact (e.g. percentage of revenue), fraction of network traffic, or custom metrics defined by the user. Entity level 206 includes entities E1, E2, E3 (companies or organizations), which are linked to their assets. For example, entity E1 is linked to both assets A1 and A2 while E1 is linked to asset A2. Portfolio level 208 includes at least one portfolio. Each portfolio Pn may include one or more entities En. The relationships between the constituents represent links critical to the operation of, for instance, the assets.

Various constituents of the network can be identified in one of several ways, which include observations of network traffic and published records. For more detail on the identification of assets and their relationships to entities, refer to commonly owned U.S. Publication No. 2017/0236077, published on Aug. 17, 2017 and titled "Relationships among technology assets and services and the entities responsible for them" the entire disclosure of which is included herein by reference. The data that are used to generate the graph 200 are collected via multiple processes, including (but not limited to) network maps, observations of network traffic, domain name system (DNS) records, server responses, malware infections, and/or published information. In some embodiments, inter-business payment data (e.g., data provided by Dun & Bradstreet, Inc., New Jersey) to discover business relationships, and therefore dependencies.

In some embodiments, network observations can be collected and stored in a database coupled to the processor. For more detail, refer to commonly owned U.S. Pat. No. 9,705,932, issued on Jul. 11, 2017 and titled "Methods and systems for creating, de-duplicating, and accessing data using an object storage system" the entire disclosure of which is included herein by reference. These network observations include DNS records (to identify DNS providers, email providers, and other relationships), server banners (to identify software and operating system dependencies and risk factors), references to resources used (e.g. JavaScript libraries), traffic data, malware (e.g. botnet) infections, software versions used within an organization, and/or records of insecure systems. In some examples, observations can be assigned to entities via their network maps. A network map can include Internet Protocol (IP, Version 4 or Version 6) address ranges, autonomous system (AS) numbers, domain names, and hostnames owned by a particular entity. Each of these entries can be associated with a date range for which it is effective. The data can be partitioned and ordered by timestamp to facilitate efficiency of processing. Some or all of these data may also be used in the hazard model that is used to determine the probability of seed events, as discussed in more detail below. For example, a service provider with a poor security posture suffers a greater average rate of disruptions and failures due to cybercrime attacks. In some examples, some or all of these data also may be used to assess the relative importance or criticality of assets. For example, those with higher volumes network traffic may have greater value, and may generate larger losses when compromised.

Disruption Simulation

Referring back to FIG. 1A, in process 104, the processor executes a plurality of Monte Carlo simulations over the dependency graph 200. To do so, the processor generates a 'seed event' according to a hazard model. A hazard model is a probability distribution over possible events (e.g. an outage of a particular network component). This probability distribution can be derived from empirical observations, from theoretical models, or from some combination of empirical observations and theoretical models. A seed event can be a failure or disruption (such as an occurrence of a botnet attack, software defect, or other systematic effect) at one or more of the constituents (assets, dependency or dependencies, entity or entities, portfolio(s)). In some examples, the seed event is generated at the dependency level 202. The seed events are drawn from a probability distribution that may be based on empirical observations of similar events (e.g., the incidence of malware infections or DNS attacks), from theoretical models, or from other models derived from empirical data. In some examples, the seed events may optionally be chosen by an end user of the system to investigate a particular scenario.

In process 106, disruptions are propagated probabilistically through the graph 200, using the conditional probability distributions on each edge 210. For example, an edge 210 may have the probability that a given asset will become unavailable, given that the dependency in question failed. The probability may be defined as the probability that the asset on the receiving end of the edge is compromised (or affected in some other specified way), given that the node on the provider end of the edge is compromised. The conditional probabilities may be determined by empirical observations of actual events, by theoretical models, or some combination of the two. In some examples, the propagation proceeds for either a fixed number of steps or until a threshold for the affected number of nodes, the magnitude of the loss, or other criterion is reached. This propagation technique can take complex dependency relationships, including transitive and circular dependent relationships, into account.

Assessing and Aggregating Loss(es)

Referring back to FIG. 1A, in process 110, potential losses assessed for some or all of the plurality of assets. In process 112, the losses are then aggregated for each asset An. In some embodiments, losses at the assets An are aggregated at the portfolio level 208, at the entity level 206, or both. In some embodiments, the losses can be aggregated per portfolio Pn or per entity En. The dependency nodes Dn, which are the sources of risk, propagate risk to assets An that rely on the dependencies. In some embodiments, other nodes, such as assets, can be made into sources of risk by creating additional dependency nodes. In some embodiments, the aggregated losses may be simple sums, or they may involve more complex loss models including thresholds, limits, and other conditions. For example, certain policies may limit losses to a certain level or certain constituent (such as per entity or per asset).

Each simulation produces an output of projected loss data. Multiple simulations are run and the outputs from the runs are stored in a database. Having repeated the simulations a plurality of times, statistics can be gathered or derived from the simulation results. These statistics can include mean expected loss or loss exceedance curves. Referring to the method 114 of FIG. 1B, in some embodiments, once the losses are assessed in process 110, the processor can determine if the statistical variance is equal to or less than a threshold in process 116. If so, the losses are aggregated in process 112. Otherwise, control returns to process 106 for one or more runs of the Monte Carlo simulation. Note that, in some embodiments, process 116 can occur after process 112 in that the variance can be measured after aggregation. In this embodiment, the post-aggregation measured variance can be optionally used as a convergence criterion. Thus, if the statistics have not converged, an additional number of simulations are executed until they do converge. The process terminates when the variance of the desired statistics reaches an acceptable level (i.e. the statistics have converged). In some embodiments, the number of simulation iterations may be chosen a priori. In other embodiments, iterations may be continued until the variance of the statistics is reduced to the desired level. For instance, the expected variance for the financial loss can be limited to 1% of the square of the mean.

Figure 3:
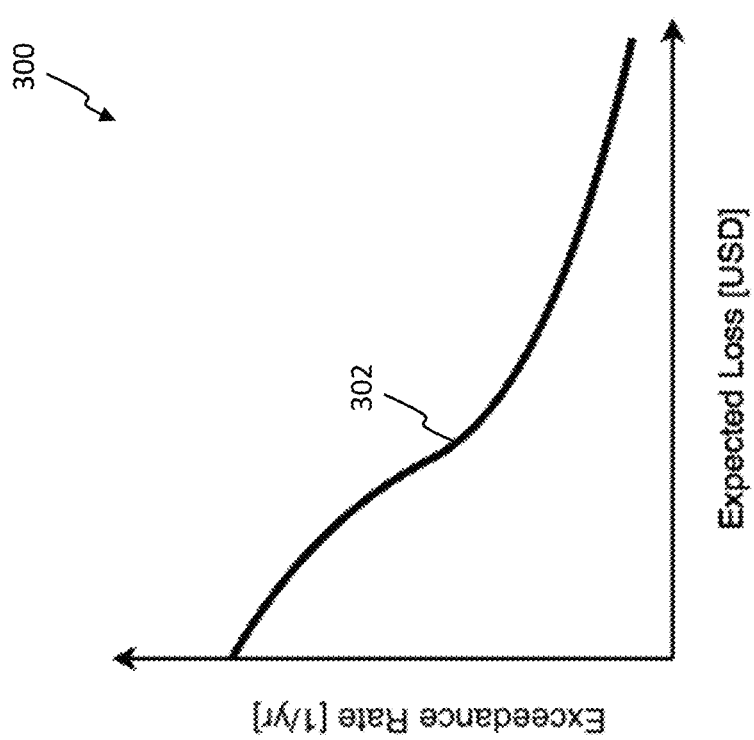
FIG. 3 is a graph of the loss exceedance curve as a function of loss in U.S. Dollars produced from the simulation results.

The simulation results can be used to identify dependencies that pose large aggregate risks, and to quantify the level of aggregate risk exposure for each portfolio or entity of interest. These results, and the statistics derived therefrom, are used to generate charts, tables, and/or metrics that can be used by a risk manager to assess and quantify risk(s) associated with entities and/or portfolios. FIG. 3 is a graph 300 of the loss exceedance curve 302 as a function of loss in U.S. Dollars produced from the simulation results. The relationship between loss and the exceedance rate (expressed in 1/year) is indirectly proportional and generally non-linear. The loss exceedance curve 302 enables a risk analyst to determine, for example, whether the rate of losses exceeding a threshold (such as a predetermined quantity of $1 million) falls within acceptable bounds of the exceedance rate (such as an incidence of once per 100 years).

In some embodiments, the results are stored in a manner that allows losses at the portfolio level to be determined dynamically (for portfolios that were not yet defined when the simulations were run), without having to repeat the computationally expensive simulation steps. This enables a user interacting with a user interface of the system to quickly evaluate how changes in portfolio composition or dependencies affect the aggregate risk. In some embodiments, the simulation results can be used to produce visualizations, tables, and other displays that may be used to interactively identify sources of aggregate risk, and to evaluate the level of aggregate risk posed by dependencies, at the portfolio and individual entity level.

System(s) For Quantifying Correlated Risk

Figure 4:
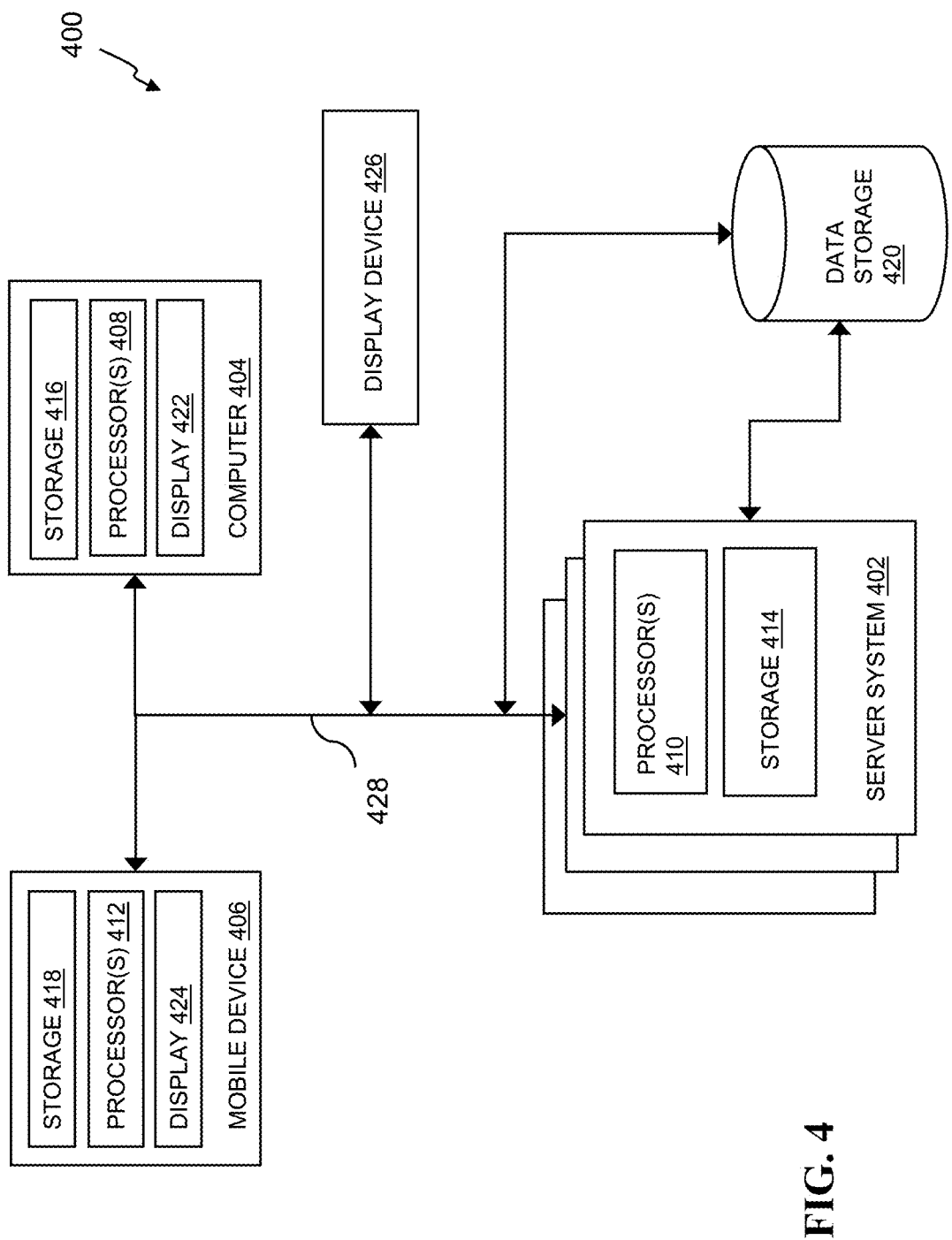
FIG. 4 is a diagram of an exemplary system 400 configured to quantify correlated risk in network of assets, one or more dependencies, one or more entities, and/or one or more portfolio.

FIG. 4 is a diagram of an exemplary system 400 configured to quantify correlated risk in network of assets, one or more dependencies, one or more entities, and/or one or more portfolio. The one or more processes of methods described herein (see FIGS. 1A-1B) may be executed by a processor of a server system 402, a computer 404, and/or a mobile device 406. In some examples, a processor 408 of computer 404 can execute a first subset of the processes (such as process 102 of FIGS. 1A-1B) while relying on a processor 410 of server system 402 to execute a second subset of the processes (such as processes 104-108 of FIGS. 1A-1B). In some embodiments, the first and second subsets of processes may overlap. Server 402, computer 404, and mobile device 406 may each have their own storage (414, 416, and 418, respectively) or be coupled to an external data storage system 420. Computer 404 and mobile device 406 may each have their own display (422 and 424, respectively) or be coupled to an external display device 426.

The term "system" 400 may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of non-volatile or volatile memory, media, and memory devices, including by way of example semiconductor memory devices, e.g., EPROM, EEPROM, and flash memory devices; magnetic disks, e.g., internal hard disks or removable disks or magnetic tapes; magneto optical disks; and CD-ROM and DVD-ROM disks. The processor and the memory can be supplemented by, or incorporated in, special purpose logic circuitry. Sometimes a server (e.g., forming a portion of the server system 402) is a general-purpose computer, and sometimes it is a custom-tailored special purpose electronic device, and sometimes it is a combination of these things.

Implementations can include a back-end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network.

Server 402, computer 404, mobile device 406, display device 426, and data storage server 420 may communicate with each other (as well as other devices and data sources) via a network 428. Network communication may take place via any media such as standard and/or cellular telephone lines, LAN or WAN links (e.g., T1, T3, 56 kb, X.25), broadband connections (ISDN, Frame Relay, ATM), wireless links, and so on. Preferably, the network 125 can carry TCP/IP protocol communications, and HTTP/HTTPS requests made by the mobile device and the connection between the mobile device 406 and the server 402 can be communicated over such networks. In some implementations, the network includes various cellular data networks such as 2G, 3G, 4G, and others. The type of network is not limited, however, and any suitable network may be used. Typical examples of networks that can serve as the communications network 428 include a wireless or wired Ethernet-based intranet, a local or wide-area network (LAN or WAN), and/or the global communications network known as the Internet, which may accommodate many different communications media and protocols.

Certain features that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

The terms and expressions employed herein are used as terms and expressions of description and not of limitation and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. The structural features and functions of the various embodiments may be arranged in various combinations and permutations, and all are considered to be within the scope of the disclosed invention. Unless otherwise necessitated, recited steps in the various methods may be performed in any order and certain steps may be performed substantially simultaneously. Accordingly, the described embodiments are to be considered in all respects as only illustrative and not restrictive. Furthermore, the configurations described herein are intended as illustrative and in no way limiting. Similarly, although physical explanations have been provided for explanatory purposes, there is no intent to be bound by any particular theory or mechanism, or to limit the claims in accordance therewith.

What is claimed is:

1. A computer-implemented method for quantifying correlated risk in a network of a plurality of assets having at least one dependency, each asset belonging to at least one entity, the method comprising:
generating a dependency graph based on relationships between the plurality of assets, the at least one dependency, and the at least one entity, wherein the dependency graph comprises (i) a plurality of edges representing relationships between the plurality of assets, the at least one dependency, and the at least one entity and (ii) a plurality of nodes representing the plurality of assets, the at least one dependency, and the at least one entity, wherein each edge has a conditional probability that the asset on a receiving node of a particular edge, of the plurality of edges, is compromised given that the providing node, of the plurality of nodes, is compromised;
executing a plurality of Monte Carlo simulations over the dependency graph, wherein each of the plurality of Monte Carlo simulations executes by:
generating a seed event in the dependency graph, the seed event having a probability distribution;
propagating disruption through the dependency graph based on the seed event; and
terminating the respective Monte Carlo Simulation when a threshold number of nodes is affected by the disruption or a threshold loss magnitude aggregated for two or more assets of the plurality of assets affected by the disruption is exceeded;
assessing, based on the plurality of Monte Carlo simulations, a loss for each asset of the plurality of assets; and
aggregating the losses for two or more assets of the plurality of assets to determine correlated risk in the network.

2. The method of claim 1, wherein:
each of the plurality of assets is selected from the group consisting of: Internet Protocol (IP) address, domain name, and server system;
each of the at least one entity is selected from the group consisting of: a company and an organization; and
each of the at least one dependency is selected from the group consisting of: hosting provider and software version.

3. The method of claim 1, further comprising:
receiving information indicative of the relationships between the plurality of assets, the at least one dependency, and the at least one entity.

4. The method of claim 3, further comprising:
storing information indicative of the relationships between the plurality of assets, the at least one dependency, and the at least one entity in a database, wherein the information is at least one of the group consisting of: domain name system (DNS) record, server banner, traffic data, malware infection, and software version.

5. The method of claim 3, further comprising:
observing traffic to and from a particular one of the plurality of assets in the network to identify at least one of (i) an entity and (ii) a dependency related to the particular asset.

6. The method of claim 3, wherein the information indicative of the relationships includes inter-business payment data.

7. The method of claim 1, wherein each of the plurality of assets is weighted according to an importance of each respective asset to the at least one entity having the asset.

8. The method of claim 1, wherein the seed event is a breach or failure of the at least one dependency.

9. The method of claim 1, wherein the probability distribution is a probability that the asset will become unavailable when the at least one dependency fails.

10. The method of claim 1, further comprising:
storing information related to the aggregated losses for the two or more assets of the plurality of assets in a database.

11. The method of claim 1, wherein the at least one entity comprises at least two entities, and a first asset of the two or more assets belongs to a first entity of the at least two entities and a second entity of the two or more assets belongs to a second entity of the at least two entities.

12. The method of claim 11, wherein at least one of the first and second assets belongs to another entity of the at least two entities.

13. The method of claim 11, further comprising:
aggregating losses for two or more entities of the at least two entities to determine correlated risk in the network.

14. The method of claim 13, further comprising:
storing information related to the aggregated losses for the two or more entities of the at least two entities in a database.

15. The method of claim 11, wherein each of the at least two entities is assigned to at least one portfolio, and wherein the method further comprises:
aggregating losses for two or more portfolios of the at least one portfolio to determine correlated risk in the network.

16. The method of claim 15, further comprising:
storing information related to the aggregated losses for the two or more entities of the at least two entities in a database.

17. The method of claim 1, wherein the aggregating losses for two or more assets of the plurality of assets to determine correlated risk in the network further comprises:
aggregating losses in a nonlinear sum for the two or more assets of the plurality of assets.

18. The method of claim 1, wherein a number of the plurality of Monte Carlo simulations is selected to reduce a statistical variance of the plurality of Monte Carlo simulations.

19. The method of claim 1, wherein the executing a plurality of Monte Carlo simulations over the dependency graph further comprises:
comparing a statistical variance to a threshold; and
terminating the plurality of Monte Carlo simulations when the statistical variance is equal to or less than the threshold.

* * * * *